US008215518B2

(12) United States Patent
Hyde et al.

(10) Patent No.: US 8,215,518 B2
(45) Date of Patent: Jul. 10, 2012

(54) TEMPERATURE-STABILIZED STORAGE CONTAINERS WITH DIRECTED ACCESS

(75) Inventors: Roderick A. Hyde, Redmond, WA (US); Edward K. Y. Jung, Bellevue, WA (US); Nathan P. Myhrvold, Medina, WA (US); Clarence T. Tegreene, Bellevue, WA (US); William H. Gates, III, Redmond, WA (US); Charles Whitmer, North Bend, WA (US); Lowell L. Wood, Jr., Bellevue, WA (US)

(73) Assignee: Tokitae LLC, Bellevue, WA (US)

( * ) Notice: Subject to any disclaimer, the term of this patent is extended or adjusted under 35 U.S.C. 154(b) by 1059 days.

(21) Appl. No.: 12/006,088

(22) Filed: Dec. 27, 2007

(65) Prior Publication Data

US 2009/0145910 A1 Jun. 11, 2009

Related U.S. Application Data

(63) Continuation-in-part of application No. 12/001,757, filed on Dec. 11, 2007, and a continuation-in-part of application No. 12/006,089, filed on Dec. 27, 2007.

(51) Int. Cl.
| | |
|---|---|
| A47J 39/00 | (2006.01) |
| A47J 41/00 | (2006.01) |
| B65D 81/38 | (2006.01) |
| B65D 83/72 | (2006.01) |
| B65D 83/00 | (2006.01) |
| B65D 43/00 | (2006.01) |
| B65D 47/00 | (2006.01) |
| A47G 19/22 | (2006.01) |

(52) U.S. Cl. .............. 220/592.26; 220/592.27; 220/705; 220/708; 220/710; 215/388; 215/247; 215/249

(58) Field of Classification Search ............. 220/592.26, 220/592.27, 705, 708, 710, DIG. 9; 215/388, 215/247, 249
See application file for complete search history.

(56) References Cited

U.S. PATENT DOCUMENTS

| | | | |
|---|---|---|---|
| 520,584 | A | 5/1894 | Turner |
| 2,717,937 | A | 9/1955 | Lehr et al. |
| 3,034,845 | A | 5/1962 | Haumann |
| 3,069,045 | A | 12/1962 | Haumann et al. |
| 3,921,844 | A | 11/1975 | Walles |
| 4,003,426 | A | 1/1977 | Best et al. |

(Continued)

FOREIGN PATENT DOCUMENTS

FR 2 621 685 10/1987

(Continued)

OTHER PUBLICATIONS

U.S. Appl. No. 12/008,695, Hyde et al.

(Continued)

*Primary Examiner* — Anthony Stashick
*Assistant Examiner* — Andrew T Kirsch

(57) ABSTRACT

Systems include one or more storage containers. A container may include one or more segments of a first ultra efficient insulation material shaped to define at least one substantially temperature-stabilized storage region, and an access region, including at least one region of the one or more segments of ultra efficient insulation material configured for at least one perforation by a perforation device, wherein one or more of the at least one perforation is configured to provide for a controlled egress of a discrete quantity of material from the at least one storage region.

17 Claims, 6 Drawing Sheets

U.S. PATENT DOCUMENTS

| | | | |
|---|---|---|---|
| 4,057,029 A | 11/1977 | Seiter | |
| 4,057,101 A | 11/1977 | Ruka et al. | |
| 4,094,127 A | 6/1978 | Romagnoli | |
| 4,184,601 A | 1/1980 | Stewart et al. | |
| 4,312,669 A | 1/1982 | Boffito et al. | |
| 4,358,490 A | 11/1982 | Nagai | |
| 4,388,051 A | 6/1983 | Dresler et al. | |
| 4,402,927 A | 9/1983 | Von Dardel et al. | |
| 4,428,854 A | 1/1984 | Enjo et al. | |
| 4,482,465 A | 11/1984 | Gray | |
| 4,526,015 A | 7/1985 | Laskaris | |
| 4,726,974 A | 2/1988 | Nowobilski et al. | |
| 4,796,432 A | 1/1989 | Fixsen et al. | |
| 4,810,403 A | 3/1989 | Bivens et al. | |
| 4,955,204 A | 9/1990 | Pehl et al. | |
| 4,956,976 A | 9/1990 | Kral et al. | |
| 4,976,308 A | 12/1990 | Faghri | |
| 5,012,102 A | 4/1991 | Gowlett | |
| 5,103,337 A | 4/1992 | Schrenk et al. | |
| 5,116,105 A * | 5/1992 | Hong | 229/103.1 |
| 5,138,559 A | 8/1992 | Kuehl et al. | |
| 5,245,869 A | 9/1993 | Clarke et al. | |
| 5,261,241 A | 11/1993 | Kitahara et al. | |
| 5,330,816 A | 7/1994 | Rusek, Jr. | |
| 5,355,684 A | 10/1994 | Guice | |
| 5,376,184 A | 12/1994 | Aspden | |
| 5,390,734 A | 2/1995 | Voorhes et al. | |
| 5,444,223 A | 8/1995 | Blama | |
| 5,452,565 A | 9/1995 | Blom et al. | |
| 5,548,116 A | 8/1996 | Pandelisev | |
| 5,563,182 A | 10/1996 | Epstein et al. | |
| 5,580,522 A | 12/1996 | Leonard et al. | |
| 5,590,054 A | 12/1996 | McIntosh | |
| 5,600,071 A | 2/1997 | Sooriakumar et al. | |
| 5,633,077 A | 5/1997 | Olinger | |
| 5,709,472 A | 1/1998 | Prusik et al. | |
| 5,782,344 A * | 7/1998 | Edwards et al. | 206/217 |
| 5,800,905 A | 9/1998 | Sheridan et al. | |
| 5,846,224 A | 12/1998 | Sword et al. | |
| 5,857,778 A | 1/1999 | Ells | |
| 5,900,554 A | 5/1999 | Baba et al. | |
| 5,915,283 A | 6/1999 | Reed et al. | |
| 6,030,580 A | 2/2000 | Raasch et al. | |
| 6,042,264 A | 3/2000 | Prusik et al. | |
| 6,050,598 A | 4/2000 | Upton | |
| 6,209,343 B1 | 4/2001 | Owen | |
| 6,212,904 B1 | 4/2001 | Arkharov et al. | |
| 6,213,339 B1 * | 4/2001 | Lee | 220/710 |
| 6,234,341 B1 | 5/2001 | Tattam | |
| 6,272,679 B1 | 8/2001 | Norin | |
| 6,453,749 B1 | 9/2002 | Petrovic et al. | |
| 6,485,805 B1 | 11/2002 | Smith et al. | |
| 6,571,971 B1 | 6/2003 | Weiler | |
| 6,673,594 B1 | 1/2004 | Owen et al. | |
| 6,692,695 B1 | 2/2004 | Bronshtein et al. | |
| 6,742,673 B2 | 6/2004 | Credle, Jr. et al. | |
| 6,751,963 B2 | 6/2004 | Navedo et al. | |
| 6,771,183 B2 * | 8/2004 | Hunter | 340/870.01 |
| 6,841,917 B2 | 1/2005 | Potter | |
| 6,877,504 B2 | 4/2005 | Schreff et al. | |
| 6,967,051 B1 | 11/2005 | Augustynowicz et al. | |
| 7,001,656 B2 | 2/2006 | Maignan et al. | |
| 7,240,513 B1 | 7/2007 | Conforti | |
| 7,258,247 B2 | 8/2007 | Marquez | |
| 7,267,795 B2 | 9/2007 | Ammann et al. | |
| 7,278,278 B2 | 10/2007 | Wowk et al. | |
| 7,596,957 B2 | 10/2009 | Fuhr et al. | |
| 2002/0050514 A1 * | 5/2002 | Schein | 229/103.1 |
| 2002/0083717 A1 | 7/2002 | Mullens et al. | |
| 2002/0084235 A1 | 7/2002 | Lake | |
| 2002/0130131 A1 | 9/2002 | Zucker et al. | |
| 2003/0072687 A1 | 4/2003 | Nehring et al. | |
| 2003/0148773 A1 | 8/2003 | Spriestersbach et al. | |
| 2004/0035120 A1 * | 2/2004 | Brunnhofer | 62/45.1 |
| 2004/0055313 A1 | 3/2004 | Navedo et al. | |
| 2004/0055600 A1 | 3/2004 | Izuchukwu | |
| 2004/0103302 A1 | 5/2004 | Yoshimura et al. | |
| 2005/0009192 A1 | 1/2005 | Page | |
| 2005/0067441 A1 | 3/2005 | Alley | |
| 2005/0247312 A1 | 11/2005 | Davies | |
| 2005/0274378 A1 | 12/2005 | Bonney et al. | |
| 2006/0021355 A1 | 2/2006 | Boesel et al. | |
| 2006/0071585 A1 | 4/2006 | Wang | |
| 2006/0191282 A1 | 8/2006 | Sekiya et al. | |
| 2006/0196876 A1 | 9/2006 | Rohwer | |
| 2006/0259188 A1 | 11/2006 | Berg | |
| 2007/0041814 A1 | 2/2007 | Lowe | |
| 2008/0269676 A1 | 10/2008 | Bieberich et al. | |
| 2009/0275478 A1 | 11/2009 | Atkins et al. | |
| 2009/0301125 A1 | 12/2009 | Myles et al. | |
| 2010/0016168 A1 | 1/2010 | Atkins et al. | |
| 2010/0028214 A1 | 2/2010 | Howard et al. | |
| 2010/0287963 A1 | 11/2010 | Billen et al. | |
| 2011/0117538 A1 | 5/2011 | Niazi | |

FOREIGN PATENT DOCUMENTS

| | | |
|---|---|---|
| GB | 2 441 636 A | 3/2008 |
| WO | WO 99/36725 A1 | 7/1999 |

OTHER PUBLICATIONS

U.S. Appl. No. 12/006,089, Hyde et al.

U.S. Appl. No. 12/001,757, Hyde et al.

Pau, Alice K.; Moodley, Neelambal K.; Holland, Diane T.; Fomundam, Henry; Matchaba, Gugu U.; and Capparelli, Edmund V.; "Instability of lopinavir/ritonavir capsules at ambient temperatures in sub-Saharan Africa: relevance to WHO antiretroviral guidelines"; AIDS; Bearing dates of 2005, Mar. 29, 2005, and Apr. 20, 2005; pp. 1229-1236; vol. 19, No. 11; Lippincott Williams & Wilkins.

U.S. Appl. No. 12/658,579, Deane et al.

Adams, R. O.; "A review of the stainless steel surface"; The Journal of Vacuum Science and Technology A; Bearing a date of Jan.-Mar. 1983; pp. 12-18; vol. 1, No. 1; American Vacuum Society.

Bartl, J., et al.; "Emissivity of aluminium and its importance for radiometric measurement"; Measurement Science Review; Bearing a date of 2004; pp. 31-36; vol. 4, Section 3.

Beavis, L. C.; "Interaction of Hydrogen with the Surface of Type 304 Stainless Steel"; The Journal of Vacuum Science and Technology; Bearing a date of Mar.-Apr. 1973; pp. 386-390; vol. 10, No. 2; American Vacuum Society.

Benvenuti, C., et al.; "Pumping characteristics of the St707 nonevaporable getter (Zr 70 V 24.6-Fe 5.4 wt %)"; The Journal of Vacuum Science and Technology A; Bearing a date of Nov.-Dec. 1996; pp. 3278-3282; vol. 14, No. 6; American Vacuum Society.

Demko, J. A., et al.; "Design Tool for Cryogenic Thermal Insulation Systems"; Advances in Cryogenic Engineering: Transactions of the Cryogenic Engineering Conference-CEC; Bearing a date of 2008; pp. 145-151; vol. 53; American Institute of Physics.

Hedayat, A., et al.; "Variable Density Multilayer Insulation for Cryogenic Storage"; Contract NAS8-40836; 36th Joint Propulsion Conference; Bearing a date of Jul. 17-19, 2000; pp. 1-10.

Horgan, A. M., et al.; "Hydrogen and Nitrogen Desorption Phenomena Associated with a Stainless Steel 304 Low Energy Electron Diffraction (LEED) and Molecular Beam Assembly"; The Journal of Vacuum Science and Technology; Bearing a date of Jul.-Aug. 1972; pp. 1218-1226; vol. 9, No. 4.

Keller, C. W., et al.; "Thermal Performance of Multilayer Insulations, Final Report, Contract NAS 3-14377"; Bearing a date of Apr. 5, 1974; pp. 1-446.

Kishiyama, K., et al.; "Measurement of Ultra Low Outgassing Rates for NLC UHV Vacuum Chambers"; Proceedings of the 2001 Particle Accelerator Conference, Chicago; Bearing a date of 2001; pp. 2195-2197; IEEE.

Little, Arthur D.; "Liquid Propellant Losses During Space Flight, Final Report on Contract No. NASw-615"; Bearing a date of Oct. 1964; pp. 1-315.

Lockheed Missiles & Space Company; "High-Performance Thermal Protection Systems, Contract NAS 8-20758, vol. II"; Bearing a date of Dec. 31, 1969; pp. 1-117.

Nemanič, Vincenc, et al.; "Experiments with a thin-walled stainless-steel vacuum chamber"; The Journal of Vacuum Science and Technology A; Bearing a date of Jul.-Aug. 2000; pp. 1789-1793; vol. 18, No. 4; American Vacuum Society.

Nemanič, Vincenc, et al.; "Outgassing of a thin wall vacuum insulating panel"; Vacuum; Bearing a date of 1998; pp. 233-237; vol. 49, No. 3; Elsevier Science Ltd.

Nemanič, Vincenc, et al.; "A study of thermal treatment procedures to reduce hydrogen outgassing rate in thin wall stainless steel cells"; Vacuum; Bearing a date of 1999; pp. 277-280; vol. 53; Elsevier Science Ltd.

PCT International Search Report; International App. No. PCT/US 09/01715; Jan. 8, 2010; pp. 1-2.

Sasaki, Y. Tito; "A survey of vacuum material cleaning procedures: A subcommittee report of the American Vacuum Society Recommended Practices Committee"; The Journal of Vacuum Science and Technology A; Bearing a date of May-Jun. 1991; pp. 2025-2035; vol. 9, No. 3; American Vacuum Society.

U.S. Department of Health and Human Services, Centers for Disease Control and Prevention; "Recommended Immunization Schedule for Persons Aged 0 Through 6 Years—United States"; Bearing a date of 2009; p. 1.

Vesel, Alenka, et al.; "Oxidation of AISI 304L stainless steel surface with atomic oxygen"; Applied Surface Science; Bearing a date of 2002; pp. 94-103; vol. 200; Elsevier Science B.V.

Young, J. R.; "Outgassing Characteristics of Stainless Steel and Aluminum with Different Surface Treatments"; The Journal of Vacuum Science and Technology; Bearing a date of Oct. 14, 1968; pp. 398-400; vol. 6, No. 3.

Zajec, Bojan, et al.; "Hydrogen bulk states in stainless-steel related to hydrogen release kinetics and associated redistribution phenomena"; Vacuum; Bearing a date of 2001; pp. 447-452; vol. 61; Elsevier Science Ltd.

U.S. Appl. No. 12/927,982, Deane et al.

U.S. Appl. No. 12/927,981, Chou et al.

Chen, Dexiang, et al.; "Opportunities and challenges of developing thermostable vaccines"; Expert Reviews Vaccines; 2009; pp. 547-557; vol. 8, No. 5; Expert Reviews Ltd.

Greenbox Systems; "Thermal Management System"; 2010; Printed on: Feb. 3, 2011; p. 1 of 1; located at http://www.greenboxsystems.com.

Matthias, Dipika M., et al.; "Freezing temperatures in the vaccine cold chain: A systematic literature review"; Vaccine; 2007; pp. 3980-3986; vol. 25; Elsevier Ltd.

Pure Temp; "Technology"; Printed on: Feb. 9, 2011; p. 1-3; located at http://puretemp.com/technology.html.

Spur Industries Inc.; "The Only Way to Get Them Apart is to Melt Them Apart"; 2006; pp. 1-3; located at http://www.spurind.com/applications.php.

Williams, Preston; "Greenbox Thermal Management System Refrigerate-able 2 to 8 C Shipping Containers"; Printed on: Feb. 9, 2011; p. 1; located at http://www.puretemp.com/documents/Refrigerate-able%202%20to%208%20C%20Shipping%20Containers.pdf.

Wirkas, Theo, et al.; "A vaccine cold chain freezing study in PNG highlights technology needs for hot climate countries"; Vaccine; 2007; pp. 691-697; vol. 25; Elsevier Ltd.

World Health Organization; "Preventing Freeze Damage to Vaccines: Aide-memoire for prevention of freeze damage to vaccines"; 2007; pp. 1-4; WHO/IVB/07.09; World Health Organization.

World Health Organization; "Temperature sensitivity of vaccines"; Department of Immunization, Vaccines and Biologicals, World Health Organization; Aug. 2006; pp. 1-62 plus cover sheet, pp. i-ix, and end sheet (73 pages total); WHO/IVB/06.10; World Health Organization.

U.S. Appl. No. 12/220,439, Hyde et al.

U.S. Appl. No. 12/152,467, Bowers et al.

U.S. Appl. No. 12/152,465, Bowers et al.

U.S. Appl. No. 13/135,126, Deane et al.

Cabeza, L. F. et al.; "Heat transfer enhancement in water when used as PCM in thermal energy storage"; Applied Thermal Engineering; 2002; pp. 1141-1151; vol. 22; Elsevier Science Ltd.

Chen, Dexiang et al.; "Characterization of the freeze sensitivity of a hepatitis B vaccine"; Human Vaccines; Jan. 2009; pp. 26-32; vol. 5, Issue 1; Landes Bioscience.

Edstam, James S. et al.; "Exposure of hepatitis B vaccine to freezing temperatures during transport to rural health centers in Mongolia"; Preventive Medicine; 2004; pp. 384-388; vol. 39; The Institute for Cancer Prevention and Elsevier Inc.

Efe, Emine et al.; "What do midwives in one region in Turkey know about cold chain?"; Midwifery; 2008; pp. 328-334; vol. 24; Elsevier Ltd.

Günter, M. M. et al.; "Microstructure and bulk reactivity of the nonevaporable getter $Zr_{57}V_{36}Fe_7$"; J. Vac. Sci. Technol. A; Nov./Dec. 1998; pp. 3526-3535; vol. 16, No. 6; American Vacuum Society.

Hipgrave, David B. et al.; "Immunogenicity of a Locally Produced Hepatitis B Vaccine With the Birth Dose Stored Outside the Cold Chain in Rural Vietnam"; Am. J. Trop. Med. Hyg.; 2006; pp. 255-260; vol. 74, No. 2; The American Society of Tropical Medicine and Hygiene.

Hipgrave, David B. et al.; "Improving birth dose coverage of hepatitis B vaccine"; Bulletin of the World Health Organization; Jan. 2006; pp. 65-71; vol. 84, No. 1; World Health Organization.

Hobson, J. P. et al.; "Pumping of methane by St707 at low temperatures"; J. Vac. Sci. Technol. A; May/Jun. 1986; pp. 300-302; vol. 4, No. 3; American Vacuum Society.

Kendal, Alan P. et al.; "Validation of cold chain procedures suitable for distribution of vaccines by public health programs in the USA"; Vaccine; 1997; pp. 1459-1465; vol. 15, No. 12/13; Elsevier Science Ltd.

Khemis, O. et al.; "Experimental analysis of heat transfers in a cryogenic tank without lateral insulation"; Applied Thermal Engineering; 2003; pp. 2107-2117; vol. 23; Elsevier Ltd.

Li, Yang et al.; "Study on effect of liquid level on the heat leak into vertical cryogenic vessels"; Cryogenics; 2010; pp. 367-372; vol. 50; Elsevier Ltd.

Magennis, Teri et al. "Pharmaceutical Cold Chain: A Gap in the Last Mile—Part 1. Wholesaler/Distributer: Missing Audit Assurance"; Pharmaceutical & Medical Packaging News; Sep. 2010; pp. 44, 46-48, and 50; pmpnews.com.

Matolin, V. et al.; "Static SIMS study of TiZrV NEG activation"; Vacuum; 2002; pp. 177-184; vol. 67; Elsevier Science Ltd.

Nelson, Carib M. et al.; "Hepatitis B vaccine freezing in the Indonesian cold chain: evidence and solutions"; Bulletin of the World Health Organization; Feb. 2004; pp. 99-105 (plus copyright page); vol. 82, No. 2; World Health Organization.

Ren, Qian et al.; "Evaluation of an Outside-The-Cold-Chain Vaccine Delivery Strategy in Remote Regions of Western China"; Public Health Reports; Sep.-Oct. 2009; pp. 745-750; vol. 124.

Rogers, Bonnie et al.; "Vaccine Cold Chain—Part 1. Proper Handling and Storage of Vaccine"; AAOHN Journal; 2010; pp. 337-344 (plus copyright page); vol. 58, No. 8; American Association of Occupational Health Nurses, Inc.

Rogers, Bonnie et al.; Vaccine Cold Chain—Part 2. Training Personnel and Program Management; AAOHN Journal; 2010; pp. 391-402 (plus copyright page); vol. 58, No. 9; American Association of Occupational Health Nurses, Inc.

Techathawat, Sirirat et al.; "Exposure to heat and freezing in the vaccine cold chain in Thailand"; Vaccine; 2007; p. 1328-1333; vol. 25; Elsevier Ltd.

Thakker, Yogini et al.; "Storage of Vaccines in the Community: Weak Link in the Cold Chain?"; British Medical Journal; Mar. 21, 1992; pp. 756-758; vol. 304, No. 6829; BMJ Publishing Group.

Wang, Lixia et al.; "Hepatitis B vaccination of newborn infants in rural China: evaluation of a village-based, out-of-cold-chain delivery strategy"; Bulletin of the World Health Organization; Sep. 2007; pp. 688-694; vol. 85, No. 9; World Health Organization.

Wei, Wei et al.; "Effects of structure and shape on thermal performance of Perforated Multi-Layer Insulation Blankets"; Applied Thermal Engineering; 2009; pp. 1264-1266; vol. 29; Elsevier Ltd.

World Health Organization; "Guidelines on the international packaging and shipping of vaccines"; Department of Immunization, Vaccines and Biologicals; Dec. 2005; 40 pages; WHO/IVB/05.23.

PCT International Search Report; International App. No. PCT/US08/13646; Apr. 9, 2009; pp. 1-2.

PCT International Search Report; International App. No. PCT/US08/13648; Mar. 13, 2009; pp. 1-2.

PCT International Search Report; International App. No. PCT/US08/13642; Feb. 26, 2009; pp. 1-2.

PCT International Search Report; International App. No. PCT/US08/13643; Feb. 20, 2009; pp. 1-2.

Bapat, S. L. et al.; "Experimental investigations of multilayer insulation"; *Cryogenics*; Bearing a date of Aug. 1990; pp. 711-719; vol. 30.

Bapat, S. L. et al.; "Performance prediction of multilayer insulation"; *Cryogenics*; Bearing a date of Aug. 1990; pp. 700-710; vol. 30.

Barth, W. et al.; "Experimental investigations of superinsulation models equipped with carbon paper"; *Cryogenics*; Bearing a date of May 1988; pp. 317-320; vol. 28.

Barth, W. et al.; "Test results for a high quality industrial superinsulation"; *Cryogenics*; Bearing a date of Sep. 1988; pp. 607-609; vol. 28.

Benvenuti, C. et al.; "Obtention of pressures in the $10^{-14}$ torr range by means of a Zr V Fe non evaporable getter"; *Vacuum*; Bearing a date of 1993; pp. 511-513; vol. 44; No. 5-7; Pergamon Press Ltd.

Benvenuti, C.; "Decreasing surface outgassing by thin film getter coatings"; *Vacuum*; Bearing a date of 1998; pp. 57-63; vol. 50; No. 1-2; Elsevier Science Ltd.

Benvenuti, C.; "Nonevaporable getter films for ultrahigh vacuum applications"; *Journal of Vacuum Science Technology a Vacuum Surfaces, and Films*; Bearing a date of Jan./Feb. 1998; pp. 148-154; vol. 16; No. 1; American Chemical Society.

Berman, A.; "Water vapor in vacuum systems"; *Vacuum*; Bearing a date of 1996; pp. 327-332; vol. 47; No. 4; Elsevier Science Ltd.

Bernardini, M. et al.; "Air bake-out to reduce hydrogen outgassing from stainless steel"; *Journal of Vacuum Science Technology*; Bearing a date of Jan./Feb. 1998; pp. 188-193; vol. 16; No. 1; American Chemical Society.

Bo, H. et al.; "Tetradecane and hexadecane binary mixtures as phase change materials (PCMs) for cool storage in district cooling systems"; *Energy*; Bearing a date of 1999; vol. 24; pp. 1015-1028; Elsevier Science Ltd.

Boffito, C. et al.; "A nonevaporable low temperature activatable getter material"; *Journal of Vacuum Science Technology*; Bearing a date of Apr. 1981; pp. 1117-1120; vol. 18; No. 3; American Vacuum Society.

Brown, R.D.; "Outgassing of epoxy resins in vacumm."; *Vacuum*; Bearing a date of 1967; pp. 25-28; vol. 17; No. 9; Pergamon Press Ltd.

Burns, H. D.; "Outgassing Test for Non-metallic Materials Associated with Sensitive Optical Surfaces in a Space Environment"; MSFC-SPEC-1443; Bearing a date of Oct. 1987; pp. 1-10.

Chen, G. et al.; "Performance of multilayer insulation with slotted shield"; *Cryogenics ICEC Supplement*; Bearing a date of 1994; pp. 381-384; vol. 34.

Chen, J. R. et al.; "An aluminum vacuum chamber for the bending magnet of the SRRC synchrotron light source"; *Vacuum*; Bearing a date of 1990; pp. 2079-2081; vol. 41; No. 7-9; Pergamon Press PLC.

Chen, J. R. et al.; "Outgassing behavior of A6063-EX aluminum alloy and SUS 304 stainless steel"; *Journal of Vacuum Science Technology*; Bearing a date of Nov./Dec. 1987; pp. 3422-3424; vol. 5; No. 6; American Vacuum Society.

Chen, J. R. et al.; "Outgassing behavior on aluminum surfaces: Water in vacuum systems"; *Journal of Vacuum Science Technology*; Bearing a date of Jul./Aug. 1994; pp. 1750-1754; vol. 12; No. 4; American Vacuum Society.

Chen, J. R. et al.; "Thermal outgassing from aluminum alloy vacuum chambers"; *Journal of Vacuum Science Technology*; Bearing a date of Nov./Dec. 1985; pp. 2188-2191; vol. 3; No. 6; American Vacuum Society.

Chen, J. R.; "A comparison of outgassing rate of 304 stainless steel and A6063-EX aluminum alloy vacuum chamber after filling with water"; *Journal of Vacuum Science Technology a Vacuum Surfaces and Film*; Bearing a date of Mar. 1987; pp. 262-264; vol. 5; No. 2; American Chemical Society.

Chiggiato, P.; "Production of extreme high vacuum with non evaporable getters" *Physica Scripta*; Bearing a date of 1997; pp. 9-13; vol. T71.

Cho, B.; "Creation of extreme high vacuum with a turbomolecular pumping system: A baking approach"; *Journal of Vacuum Science Technology*; Bearing a date of Jul./Aug. 1995; pp. 2228-2232; vol. 13; No. 4; American Vacuum Society.

Choi, S. et al.; "Gas permeability of various graphite/epoxy composite laminates for cryogenic storage systems"; *Composites Part B: Engineering*; Bearing a date of 2008; pp. 782-791; vol. 39; Elsevier Science Ltd.

Chun, I. et al.; "Effect of the Cr-rich oxide surface on fast pumpdown to ultrahigh vacuum"; *Journal of Vacuum Science Technology a Vacuum, Surfaces, and Films*; Bearing a date of Sep./Oct. 1997; pp. 2518-2520; vol. 15; No. 5; American Vacuum Society.

Chun, I. et al.; "Outgassing rate characteristic of a stainless-steel extreme high vacuum system"; *Journal of Vacuum Science Technology*; Bearing a date of Jul./Aug. 1996; pp. 2636-2640; vol. 14; No. 4; American Vacuum Society.

Crawley, D J. et al.; "Degassing Characteristics of Some 'O' Ring Materials"; *Vacuum*; Bearing a date of 1963; pp. 7-9; vol. 14; Pergamon Press Ltd.

Csernatony, L.; "The Properties of Viton 'A' Elastomers II. The influence of permeation, diffusion and solubility of gases on the gas emission rate from an O-ring used as an atmospheric seal or high vacuum immersed"; *Vacuum*; Bearing a date of 1965; pp. 129-134; vol. 16; No. 3; Pergamon Press Ltd.

Day, C.; "The use of active carbons as cryosorbent"; *Colloids and Surfaces a Physicochemical and Engineering Aspects*; Bearing a date of 2001; pp. 187-206; vol. 187-188; Elsevier Science.

Della Porta, P.; "Gas problem and gettering in sealed-off vacuum devices"; *Vacuum*; Bearing a date of 1996; pp. 771-777; vol. 47; No. 6-8 Elsevier Science Ltd.

Dylla, H. F. et al.; "Correlation of outgassing of stainless steel and aluminum with various surface treatments"; *Journal of Vacuum Science Technology*; Bearing a date of Sep./Oct. 1993; pp. 2623-2636; vol. 11; No. 5; American Vacuum Society.

Elsey, R. J. "Outgassing of vacuum material I"; *Vacuum*; Bearing a date of 1975; pp. 299-306; vol. 25; No. 7; Pergamon Press Ltd.

Elsey, R. J. "Outgassing of vacuum materials II" *Vacuum*; Bearing a date of 1975; pp. 347-361; vol. 25; No. 8; Pergamon Press Ltd.

Engelmann, G. et al.; "Vacuum chambers in composite material"; *Journal of Vacuum Science Technology*; Bearing a date of Jul./Aug. 1987; pp. 2337-2341; vol. 5; No. 4; American Vacuum Society.

Eyssa, Y. M. et al.; "Thermodynamic optimization of thermal radiation shields for a cryogenic apparatus"; *Cryogenics*; Bearing a date of May 1978; pp. 305-307; vol. 18; IPC Business Press.

Glassford, A. P. M. et al.; "Outgassing rate of multilayer insulation"; *1978*; Bearing a date of 1978; pp. 83-106.

Gupta, A. K. et al.; "Outgassing from epoxy resins and methods for its reduction"; *Vacuum*; Bearing a date of 1977; pp. 61-63; vol. 27; No. 12; Pergamon Press Ltd.

HaŁaczek, T. et al.; "Flat-plate cryostat for measurements of multilayer insulation thermal conductivity"; *Cryogenics*; Bearing a date of Oct. 1985; pp. 593-595; vol. 25; Butterworth & Co. Ltd.

HaŁaczek, T. et al.; "Unguarded cryostat for thermal conductivity measurements of multilayer insulations"; *Cryogenics*; Bearing a date of Sep. 1985; pp. 529-530; vol. 25; Butterworth & Co. Ltd.

HaŁaczek, T. L. et al.; "Heat transport in self-pumping multilayer insulation"; *Cryogenics*; Bearing a date of Jun. 1986; pp. 373-376; vol. 26; Butterworth & Co. Ltd.

HaŁaczek, T. L. et al.; "Temperature variation of thermal conductivity of self-pumping multilayer insulation"; *Cryogenics*; Bearing a date of Oct. 1986; pp. 544-546.; vol. 26; Butterworth & Co. Ltd.

Halldórsson, Árni, et al.; "The sustainable agenda and energy efficiency: Logistics solutions and supply chains in times of climate change"; *International Journal of Physical Distribution & Logistics Management*; Bearing a date of 2010; pp. 5-13; vol. 40; No. ½; Emerald Group Publishing Ltd.

Halliday, B. S.; "An introduction to materials for use in vacuum"; *Vacuum*; Bearing a date of 1987; pp. 583-585; vol. 37; No. 8-9; Pergamon Journals Ltd.

Hirohata, Y.; "Hydrogen desorption behavior of aluminium materials used for extremely high vacuum chamber"; *Journal of Vacuum Science Technology*; Bearing a date of Sep./Oct. 1993; pp. 2637-2641; vol. 11; No. 5; American Vacuum Society.

Holtrop, K. L. et al.; "High temperature outgassing tests on materials used in the DIII-D tokamak"; *Journal of Vacuum Science Technology*; Bearing a date of Jul./Aug. 2006; pp. 1572—; vol. 24; No. 4; American Vacuum Society.

Hong, S. et al.; "Investigation of gas species in a stainless steel ultrahigh vacuum chamber with hot cathode ionization gauges"; *Measurement Science and Technology*; Bearing a date of 2004; pp. 359-364; vol. 15; IOP Science.

Ishikawa, Y. et al.; "Reduction of outgassing from stainless surfaces by surface oxidation"; *Vacuum*; Bearing a date of 1990; pp. 1995-1997; vol. 4; No. 7-9; Pergamon Press PLC.

Ishikawa, Y.; "An overview of methods to suppress hydrogen outgassing rate from austenitic stainless steel with reference to UHV and EXV"; *Vacuum*; Bearing a date of 2003; pp. 501-512; vol. 69; No. 4; Elsevier Science Ltd.

Ishimaru, H. et al.; "All Aluminum Alloy Vacuum System for the TRISTAN e+ 1e-Storage"; *IEEE Transactions on Nuclear Science*; Bearing a date of Jun. 1981; pp. 3320-3322; vol. NS-28; No. 3.

Ishimaru, H. et al.; "Fast pump-down aluminum ultrahigh vacuum system"; *Journal of Vacuum Science Technology*; Bearing a date of May/Jun. 1992; pp. 547-552 ; vol. 10; No. 3; American Vacuum Society.

Ishimaru, H. et al.; "Turbomolecular pump with an ultimate pressure of $10^{-12}$ Torr"; *Journal of Vacuum Science Technology*; Bearing a date of Jul./Aug. 1994; pp. 1695-1698; vol. 12; No. 4; American Vacuum Society.

Ishimaru, H.; "All-aluminum-alloy ultrahigh vacuum system for a large-scale electron-positron collider"; *Journal of Vacuum Science Technology*; Bearing a date of Jun. 1984; pp. 1170-1175; vol. 2; No. 2; American Vacuum Society.

Ishimaru, H.; "Aluminium alloy-sapphire sealed window for ultrahigh vacuum"; *Vacuum*; Bearing a date of 1983; pp. 339-340.; vol. 33; No. 6; Pergamon Press Ltd.

Ishimaru, H.; "Bakeable aluminium vacuum chamber and bellows with an aluminium flange and metal seal for ultra-high vacuum"; *Journal of Vacuum Science Technology*; Bearing a date of Nov./Dec. 1978; pp. 1853-1854; vol. 15; No. 6; American Vacuum Society.

Ishimaru, H.; "Ultimate pressure of the order of $10^{-13}$ Torr in an aluminum alloy vacuum chamber"; *Journal of Vacuum Science and Technology*; Bearing a date of May/Jun. 1989; pp. 2439-2442; vol. 7; No. 3; American Vacuum Society.

Jacob, S. et al.; "Investigations into the thermal performance of multilayer insulation (300-77 K) Part 2: Thermal analysis"; *Cryogenics*; Bearing a date of 1992; pp. 1147-1153; vol. 32; No. 12; Butterworth-Heinemann Ltd.

Jacob, S. et al.; "Investigations into the thermal performance of multilayer insulation (300-77 K) Part 1: Calorimetric studies"; *Cryogenics*; Bearing a date of 1992; pp. 1137-1146; vol. 32; No. 12; Butterworth-Heinemann Ltd.

Jenkins, C. H. M.; "Gossamer spacecraft: membrane and inflatable structures technology for space applications"; AIAA; Bearing a date of 2000; pp. 503-527; vol. 191.

Jhung, K. H. C. et al.; "Achievement of extremely high vacuum using a cryopump and conflat aluminium"; *Vacuum*; Bearing a date of 1992; pp. 309-311; vol. 43; No. 4; Pergamon Press PLC.

Kato, S. et al.; "Achievement of extreme high vacuum in the order of $10^{-10}$ Pa without baking of test chamber"; *Journal of Vacuum Science Technology*; Bearing a date of May/Jun. 1990; pp. 2860-2864; vol. 8 ; No. 3; American Vacuum Society.

Keller, K. et al.; "Application of high temperature multilayer insulations"; *Acta Astronautica* ; Bearing a date of 1992; pp. 451-458; vol. 26; No. 6; Pergamon Press Ltd.

Koyatsu, Y. et al. "Measurements of outgassing rate from copper and copper alloy chambers"; *Vacuum*; Bearing a date of 1996; pp. 709-711; vol. 4; No. 6-8; Elsevier Science Ltd.

Kristensen, D. et al.; "Stabilization of vaccines: Lessons learned"; *Human Vaccines*; Bearing a date of Mar. 2010; pp. 227-231; vol. 6; No. 3; Landes Bioscience.

Kropschot, R. H.; "Multiple layer insulation for cryogenic applications"; *Cryogenics*; Bearing a date of Mar. 1961; pp. 135-135; vol. 1.

Li, Y.; "Design and pumping characteristics of a compact titanium—vanadium non-evaporable getter pump"; *Journal of Vacuum Science Technology*; Bearing a date of May/Jun. 1998; pp. 1139-1144; vol. 16; No. 3; American Vacuum Society.

Liu, Y. C. et al.; "Thermal outgassing study on aluminum surfaces"; *Vacuum*; Bearing a date of 1993; pp. 435-437; vol. 44; No. 5-7; Pergamon Press Ltd.

Londer, H. et al.; "New high capacity getter for vacuum insulated mobile LH2 storage tank systems"; *Vacuum*; Bearing a date of 2008; pp. 431-434; vol. 82; No. 4; Elsevier Ltd.

Matsuda, A. et al.; "Simple structure insulating material properties for multilayer insulation"; *Cryogenics*; Bearing a date of Mar. 1980; pp. 135-138; vol. 20; IPC Business Press.

Mikhalchenko, R. S. et al.; "Study of heat transfer in multilayer insulations based on composite spacer materials."; *Cryogenics*; Bearing a date of Jun. 1983; pp. 309-311; vol. 23; Butterworth & Co. Ltd.

Mikhalchenko, R. S. et al.; "Theoretical and experimental investigation of radiative-conductive heat transfer in multilayer insulation"; *Cryogenics*; Bearing a date of May 1985; pp. 275-278; vol. 25; Butterworth & Co. Ltd.

Miki, M. et al.; "Characteristics of extremely fast pump-down process in an aluminum ultrahigh vacuum system"; *Journal of Vacuum Science Technology*; Bearing a date of Jul./Aug. 1994; pp. 1760-1766; vol. 12; No. 4; American Vacuum Society.

Mohri, M. et al.; "Surface study of Type 6063 aluminium alloys for vacuum chamber materials"; *Vacuum*; Bearing a date of 1984; pp. 643-647; vol. 34; No. 6; Pergamon Press Ltd.

Mukugi, K. et al.; "Characteristics of cold cathode gauges for outgassing measurements in uhv range"; *Vacuum*; Bearing a date of 1993; pp. 591-593; vol. 44; No. 5-7; Pergamon Press Ltd.

Nemanič, V. et al.; "Anomalies in kinetics of hydrogen evolution from austenitic stainless steel from 300 to 1000° C"; *Journal of Vacuum Science Technology*; Bearing a date of Jan./Feb. 2001; pp. 215-222; vol. 19; No. 1; American Vacuum Society.

Nemanič, V. et al.; "Outgassing in thin wall stainless steel cells"; *Journal of Vacuum Science Technology*; Bearing a date of May/Jun. 1999; pp. 1040-1046; vol. 17; No. 3; American Vacuum Society.

Nemanič, V.; "Outgassing of thin wall stainless steel chamber"; *Vacuum*; Bearing a date of 1998; pp. 431-437; vol. 50; No. 3-4; Elsevier Science Ltd.

Nemanič, V.; "Vacuum insulating panel"; *Vacuum*; bearing a date of 1995; pp. 839-842; vol. 46; No. 8-10; Elsevier Science Ltd.

Odaka, K. et al.;"Effect of baking temperature and air exposure on the outgassing rate of type 316L stainless steel"; *Journal of Vacuum Science Technology*; Bearing a date of Sep./Oct. 1987; pp. 2902-2906; vol. 5; No. 5; American Vacuum Society.

Odaka, K.; "Dependence of outgassing rate on surface oxide layer thickness in type 304 stainless steel before and after surface oxidation in air"; *Vacuum*; Bearing a date of 1996; pp. 689-692; vol. 47; No. 6-8; Elsevier Science Ltd.

Okamura, S. et al.; "Outgassing measurement of finely polished stainless steel"; *Journal of Vacuum Science Technology*; Bearing a date of Jul./Aug. 1991; pp. 2405-2407; vol. 9; No. 4; American Vacuum Society.

Patrick, T. J.; "Outgassing and the choice of materials for space instrumentation"; *Vacuum*; Bearing a date of 1973; pp. 411-413; vol. 23; No. 11; Pergamon Press Ltd.

Patrick, T. J.; "Space environment and vacuum properties of spacecraft materials"; *Vacuum*; Bearing a date of 1981; pp. 351-357; vol. 31; No. 8-9; Pergamon Press Ltd.

Poole, K. F. et al.; "Hialvac and Teflon outgassing under ultra-high vacuum conditions"; *Vacuum*; Bearing a date of Jun. 30, 1980; pp. 415-417; vol. 30; No. 10; Pergamon Press Ltd.

Redhead, P. A.; "Recommended practices for measuring and reporting outgassing data"; *Journal of Vacuum Science Technology*; Bearing a date of Sep./Oct. 2002; pp. 1667-1675; vol. 20; No. 5; American Vacuum Society.

Rutherford, S; "The Benefits of Viton Outgassing"; Bearing a date of 1997; pp. 1-5; Duniway Stockroom Corp.

Saito, K. et al.; "Measurement system for low outgassing materials by switching between two pumping paths"; *Vacuum*; Bearing a date of 1996; pp. 749-752; vol. 47; No. 6-8; Elsevier Science Ltd.

Saitoh, M. et al.; "Influence of vacuum gauges on outgassing rate measurements"; *Journal of Vacuum Science Technology*; Bearing a date of Sep./Oct. 1993; pp. 2816-2821; vol. 11; No. 5; American Vacuum Society.

Santhanam, S. M. T. J. et al.; "Outgassing rate of reinforced epoxy and its control by different pretreatment methods"; *Vacuum*; Bearing a date of 1978; pp. 365-366; vol. 28; No. 8-9; Pergamon Press Ltd.

Sasaki, Y. T.; "Reducing SS 304/316 hydrogen outgassing to $2\times10^{-15}$ torr $1/cm^2s$"; *Journal of Vacuum Science Technology*; Bearing a date of Jul./Aug. 2007; pp. 1309-1311; vol. 25; No. 4; American Vacuum Society.

Scurlock, R. G. et al.; "Development of multilayer insulations with thermal conductivities below 0.1 $\mu W\ cm^{-1}\ K^{-1}$"; *Cryogenics*; Bearing a date of May 1976; pp. 303-311; vol. 16.

Setia, S. et al.; "Frequency and causes of vaccine wastage"; *Vaccine*; Bearing a date of 2002; pp. 1148-1156; vol. 20; Elsevier Science Ltd.

Shu, Q. S. et al.; "Heat flux from 277 to 77 K through a few layers of multilayer insulation"; *Cryogenics*; Bearing a date of Dec. 1986; pp. 671-677; vol. 26; Butterworth & Co. Ltd.

Shu, Q. S. et al.; "Systematic study to reduce the effects of cracks in multilayer insulation Part 1: Theoretical model"; *Cryogenics*; Bearing a date of May 1987; pp. 249-256; vol. 27; Butterworth & Co. Ltd.

Shu, Q. S. et al.; "Systematic study to reduce the effects of cracks in multilayer insulation Part 2: experimental results"; *Cryogenics*; Bearing a date of Jun. 1987; pp. 298-311; vol. 27; No. 6; Butterworth & Co. Ltd.

Suemitsu, M. et al.; "Development of extremely high vacuums with mirror-polished Al-alloy chambers"; *Vacuum*; Bearing a date of 1993; pp. 425-428; vol. 44; No. 5-7; Pergamon Press Ltd.

Suemitsu, M. et al.; "Ultrahigh-vacuum compatible mirror-polished aluminum-alloy surface: Observation of surface-roughness-correlated outgassing rates"; *Journal of Vacuum Science Technology*; Bearing a date of May/Jun. 1992; pp. 570-572; vol. 10; No. 3; American Vacuum Society.

Tatenuma, K. et al.; "Acquisition of clean ultrahigh vacuum using chemical treatment"; *Journal of Vacuum Science Technology*; Bearing a date of Jul./Aug. 1998; pp. 2693-2697; vol. 16; No. 4; American Vacuum Society.

Tatenuma, K.; "Quick acquisition of clean ultrahigh vacuum by chemical process technology"; *Journal of Vacuum Science Technology*; Bearing a date of Jul./Aug. 1993; pp. 2693-2697; vol. 11; No. 4; American Vacuum Society.

Tripathi, A. et al.; "Hydrogen intake capacity of ZrVFe alloy bulk getters"; *Vacuum*; Bearing a date of Aug. 6, 1997; pp. 1023-1025; vol. 48; No. 12; Elsevier Science Ltd.

Watanabe, S. et al.; "Reduction of outgassing rate from residual gas analyzers for extreme high vacuum measurements"; *Journal of Vacuum Science Technology*; Bearing a date of Nov./Dec. 1996; pp. 3261-3266; vol. 14; No. 6; American Vacuum Society.

Wiedemann, C. et al.; "Multi-layer Insulation Literatures Review"; *Advances*; Printed on May 2, 2011; pp. 1-10; German Aerospace Center.

Yamazaki, K. et al.; "High-speed pumping to UHV"; *Vacuum*; Bearing a date of 2010; pp. 756-759; vol. 84; Elsevier Science Ltd.

Zalba, B. et al.; "Review on thermal energy storage with phase change: materials, heat transfer analysis and applications"; *Applied Thermal Engineering*; Bearing a date of 2003; pp. 251-283; vol. 23; Elsevier Science Ltd.

Zhitomirskij, I.S. et al.; "A theoretical model of the heat transfer processes in multilayer insulation"; *Cryogenics*; Bearing a date of May 1979; pp. 265-268; IPC Business Press.

PCT International Search Report; International App. No. PCT/US 11/00234; Jun. 9, 2011; pp. 1-4.

Chinese State Intellectual Property Office; First Office Action; App No. 200880119918.0; Jul. 13, 2011.

U.S. Appl. No. 13/200,555, Chou et al.

U.S. Appl. No. 13/199,439, Hyde et al.

Saes Getters; "St707 Getter Alloy for Vacuum Systems"; printed on Sep. 22, 2011; pp. 1-2; located at http://www.saegetters.com/default.aspx?idPage=212.

3M Monitor Mark™; "Time Temperature Indicators—Providing a visual history of time temperature exposure"; 3M Microbiology; bearing a date of 2006; pp. 1-4; located at 3M.com/microbiology.

Arora, Anubhav; Hakim, Itzhak; Baxter, Joy; Rathnasingham, Ruben; Srinivasan, Ravi; Fletcher, Daniel A.; "Needle-Free Delivery of Macromolecules Across the Skin by Nanoliter-Volume Pulsed Microjets"; PNAS Applied Biological Sciences; Mar. 13, 2007; pp. 4255-4260; vol. 104; No. 11; The National Academy of Sciences USA.

Bang, Abhay T.; Bang, Rani A.; Baitule, Sanjay B.; Reddy, M. Hanimi; Deshmukh, Mahesh D.; "Effect of Home-Based Neonatal Care and Management of Sepsis on Neonatal Mortality: Field Trial in Rural India"; The Lancet; Dec. 4, 1999; pp. 1955-1961; vol. 354; Search (Society for Education, Action, and Research in Community Health).

Brenzel, Logan; Wolfson, Lara J.; Fox-Rushby, Julia; Miller, Mark; Halsey, Neal A.; "Vaccine-Preventable Diseases—Chapter 20"; Disease Control Priorities in Developing Countries; printed on Oct. 15, 2007; pp. 389-411.

CDC; "Vaccine Management: Recommendations for Storage and Handling of Selected Biologicals"; Jan. 2007; 16 pages total; Department of Health & Human Services U.S.A.

Chiritescu, Catalin; Cahill, David G.; Nguyen, Ngoc; Johnson, David; Bodapati, Arun; Keblinski, Pawel; Zschack, Paul; "Ultralow Thermal Conductivity in Disordered, Layered $WSe_2$ Crystals; Science"; Jan. 19, 2007; pp. 351-353; vol. 315; The American Association for the Advancement of Science.

Cohen, Sharon; Hayes, Janice S. Tordella, Tracey; Puente, Ivan; "Thermal Efficiency of Prewarmed Cotton, Reflective, and Forced—Warm-Air Inflatable Blankets in Trauma Patients"; International Journal of Trauma Nursing; Jan.-Mar. 2002; pp. 4-8; vol. 8; No. 1; The Emergency Nurses Association.

Cole-Parmer; "Temperature Labels and Crayons"; www.coleparmer.com; bearing a date of 1971 and printed on Sep. 27, 2007; p. 1.

Cornell University Coop; "The Food Keeper"; printed on Oct. 15, 2007; 7 pages total (un-numbered).

Daryabeigi, Kamran; "Thermal Analysis and Design Optimization of Multilayer Insulation for Reentry Aerodynamic Heating"; Journal of Spacecraft and Rockets; Jul.-Aug. 2002; pp. 509-514; vol. 39; No. 4; American Institute of Aeronautics and Astronautics Inc.

Department of Health and Social Services, Division of Public Health, Section of Community Health and EMS, State of Alaska; Cold Injuries Guidelines—Alaska Multi-Level 2003 Version; bearing dates of 2003 and Jan. 2005; pp. 1-60; located at http://www.chems.alaska.gov.

Ette, Ene I.; "Conscience, the Law, and Donation of Expired Drugs"; The Annals of Pharmacotherapy; Jul./Aug. 2004; pp. 1310-1313; vol. 38.

Fricke, Jochen; Emmerling, Andreas; "Aerogels—Preparation, Properties, Applications"; Structure and Bonding; 1992; pp. 37-87; vol. 77; Springer-Verlag Berlin Heidelberg.

JAMC; "Preventing Cold Chain Failure: Vaccine Storage and Handling"; JAMC; Oct. 26, 2004; p. 1050; vol. 171; No. 9; Canadian Medical Association.

Jorgensen, Pernille; Chanthap, Lon; Rebueno, Antero; Tsuyuoka, Reiko; Bell, David; "Malaria Rapid Diagnostic Tests in Tropical Climates: The Need for a Cool Chain"; American Journal of Tropical Medicine and Hygiene; 2006; pp. 750-754; vol. 74; No. 5; The American Society of Tropical Medicine and Hygiene.

Levin, Carol E.; Nelson, Carib M.; Widjaya, Anton; Moniaga, Vanda; Anwar, Chairiyah; "The Costs of Home Delivery of a Birth Dose of Hepatitis B Vaccine in a Prefilled Syringe in Indonesia"; Bulletin of the World Health Organization; Jun. 2005; pp. 456-461 + 1 pg. Addenda; vol. 83; No. 6.

Llanos-Cuentas, A.; Campos, P.; Clendenes, M.; Canfield. C.J.; Hutchinson, D.B.A.; "Atovaquone and Proguanil Hydrochloride Compared with Chloroquine or Pyrimethamine/Sulfadoxine for Treatment of Acute Plasmodium Falciparum Malaria in Peru"; The Brazilian Journal of Infectious Diseases; 2001; pp. 67-72; vol. 5; No. 2; The Brazilian Journal of Infectious Diseases and Contexto Publishing.

Lockman, Shahin; Ndase, P.; Holland, D.; Shapiro, R.; Connor, J.; Capparelli, E.; "Stability of Didanosine and Stavudine Pediatric Oral Solutions and Kaletra Capsules at Temperatures from 4° C to 55° C"; 12th Conference on Retroviruses and Opportunistic Infections, Boston, Massachusetts; Feb. 22-25, 2005; p. 1; Foundation for Retrovirology and Human Health.

Moonasar, Devanand; Goga, Ameena Ebrahim; Frean, John; Kruger, Philip; Chandramohan; Daniel; "An Exploratory Study of Factors that Affect the Performance and Usage of Rapid Diagnostic Tests for Malaria in the Limpopo Province, South Africa"; Malaria Journal; Jun. 2007; pp. 1-5; vol. 6; No. 74; Moonasar et al.; licensee BioMed Central Ltd.

Moshfegh, B.; "A New Thermal Insulation System for Vaccine Distribution; Journal of Thermal Insulation"; Jan. 1992; pp. 226-247; vol. 15; Technomic Publishing Co., Inc.

Nolan, Timothy D. C.; Hattler, Brack G.; Federspiel, William J.; "Development of a Balloon Volume Sensor for Pulsating Balloon Catheters"; ASAIO Journal; 2004; pp. 225-233; vol. 50; No. 3; American Society of Artificial Internal Organs.

Path—A Catalyst for Global Health; "Uniject™ Device—The Radically Simple Uniject™ Device—Rethinking the Needle to Improve Immunization"; bearing dates of 1995-2006; printed on Oct. 11, 2007; pp. 1-2; located at http://www.path.org/projects/uniject.php; Path Organization.

Pekala, R. W.; "Organic Aerogels From the Polycondensation of Resorcinol With Formaldehyde"; Journal of Materials Science; Sep. 1989; pp. 3221-3227; vol. 24; No. 9; Springer Netherlands.

Pickering, Larry K.; Wallace, Gregory; Rodewald, Lance; "Too Hot, Too Cold: Issues with Vaccine Storage"; Pediatrics®—Official Journal of the American Academy of Pediatrics; 2006; pp. 1738-1739 (4 pages total, incl. cover sheet and end page); vol. 118; American Academy of Pediatrics.

Post, Richard F.; "Maglev: A New Approach"; Scientific American; Jan. 2000; pp. 82-87; Scientific American, Inc.

Program for Appropriate Technology in Health (PATH); "The Radically Simple Uniject Device"; PATH—Reflections on Innovations in Global Health; printed on Jan. 26, 2007; pp. 1-4; located at www.path.org.

Reeler, Anne V.; Simonsen, Lone; Health Access International; "Unsafe Injections, Fatal Infections"; Bill and Melinda Gates Children's Vaccine Program Occasional Paper #2; May 2000; pp. 1-8; located at www.ChildrensVaccine.org/html/safe_injections.htm.

Risha, Peter G.; Shewiyo, Danstan; Msami, Amani; Masuki, Gerald; Vergote, Geert; Vervaet, Chris; Remon, Jean Paul; "In vitro Evaluation of the Quality of Essential Drugs on the Tanzanian Market"; Tropical Medicine and International Health; Aug. 2002; pp. 701-707; vol. 7; No. 8; Blackwell Science Ltd.

Seto, Joyce; Marra, Fawziah; "Cold Chain Management of Vaccines"; Continuing Pharmacy Professional Development Home Study Program; Feb. 2005; pp. 1-19; University of British Columbia.

Shockwatch; "Environmental Indicators"; printed on Sep. 27, 2007; pp. 1-2; located at www.shockwatch.com.

Suttmeier, Chris; "Warm Mix Asphalt: A Cooler Alternative"; Material Matters—Around the Hot Mix Industry; Spring 2006; pp. 21-22; Peckham Materials Corporation.

Thompson, Marc T.; "Eddy current magnetic levitation—Models and experiments"; IEEE Potentials; Feb./Mar. 2000; pp. 40-46; IEEE.

"Two Wire Gage / Absolute Pressure Transmitters—Model 415 and 440"; Honeywell Sensotec; pp. 1-2; Located at www.sensotec.com and www.honeywell.com/sensing.

Unicef Regional Office for Latin America & The Carribean (UNICEF-TACRO); Program for Appropriate Technology in Health (PATH); "Final Report Cold Chain Workshop," Panama City, May 31-Jun. 2, 2006; pp. 1-4 plus cover sheet, table of contents, and annexes A, B and C (22 pages total).

Valmary, Severine; Richard, Pomone; Brousset, Pierre; "Frequent Detection of Kaposi's Sarcoma Herpesvirus in Germinal Centre Macrophages from AIDS-related multicentric Castleman's Disease"; AIDS—Research Letters; 2005; pp. 1229-1236; vol. 19; Lippincott Williams & Wilkins.

World Health Organization; "Getting started with vaccine vial monitors; Vaccines and Biologicals"; World Health Organization; Dec. 2002; pp. 1-20 plus cover sheets, end sheet, contents pages, abbreviations page; revision history page and acknowledgments page (29 pages total); World Health Organization; located at www.who.int/vaccines-documents.

World Health Organization; "Getting started with vaccine vial monitors—Questions and answers on field operations"; Technical Session on Vaccine Vial Monitors, Mar. 27, 2002, Geneva; pp. 1-17 (p. 2 left intentionally blank); World Health Organization.

Yamakage, Michiaki; Sasaki, Hideaki; Jeong, Seong-Wook; Iwasaki, Sohshi; Namiki, Akiyoshi; "Safety and Beneficial Effect on Body Core Temperature of Prewarmed Plasma Substitute Hydroxyethyl Starch During Anesthesia" [Abstract]; Anesthesiology; 2004; p. A-1285; vol. 101; ASA.

Zhu, Z. Q.; Howe, D.; "Halbach Permanent Magnet Machines and Applications: A Review"; IEE Proceedings—Electric Power Applications; Jul. 2001; pp. 299-308; vol. 148; No. 4; University of Sheffield, Department of Electronic & Electrical Engineering, Sheffield, United Kingdom.

U.S. Appl. No. 12/077,322, Hyde et al.

U.S. Appl. No. 12/012,490, Hyde et al.

Ferrotec; "Ferrofluid: Magnetic Liquid Technology"; bearing dates of 2001-2008; printed on Mar. 10, 2008; found at http://www.ferrotec.com/technology/ferrofluid.php.

Ma, Kun-Quan; and Liu, Jing; "Nano liquid-metal fluid as ultimate coolant"; Physics Letters A; bearing dates of Jul. 10, 2006, Sep. 9, 2006, Sep. 18, 2006, Sep. 26, 2006, and Jan. 29, 2007; 252-256; vol. 361, Issue 3; Elsevier B.V.

U.S. Appl. No. 13/385,088, Hyde et al.

U.S. Appl. No. 13/374,218, Hyde et al.

PCT International Search Report; Application No. PCT/US2011/001939; Mar. 27, 2012; pp. 1-2.

Chinese State Intellectual Property Office; App. No. 200880119777.2; Mar. 30, 2012; pp. 1-10 (no. translation available).

* cited by examiner

TEMPERATURE-STABILIZED STORAGE CONTAINERS WITH DIRECTED ACCESS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/001,757, entitled TEMPERATURE-STABILIZED STORAGE CONTAINERS, naming Roderick A. Hyde; Edward K. Y. Jung; Nathan P. Myhrvold; Clarence T. Tegreene; William H. Gates, III; Charles Whitmer; and Lowell L. Wood, Jr. as inventors, filed Dec. 11, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/006,089, entitled TEMPERATURE-STABILIZED STORAGE SYSTEMS, naming Roderick A. Hyde; Edward K. Y. Jung; Nathan P. Myhrvold; Clarence T. Tegreene; William H. Gates, III; Charles Whitmer; and Lowell L. Wood, Jr, as inventors, filed Dec. 27, 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

Some aspects include at least one substantially thermally sealed storage container, including one or more segments of a first ultra efficient insulation material shaped to define at least one substantially temperature-stabilized storage region, and an access region, including at least one region of the one or more segments of a first ultra efficient insulation material configured for at least one perforation by a perforation device, wherein one or more of the at least one perforation is configured to provide for a controlled egress of a quantity of a material from the at least one storage region. In addition to the foregoing, other aspects are described in the claims, drawings, and text forming a part of the present disclosure.

Some aspects include at least one substantially thermally sealed storage container, including a storage structure, including one or more segments of ultra efficient insulation material shaped to define at least one substantially temperature-stabilized storage region, and an access structure, including at least one region of the one or more segments of ultra efficient insulation material which may be displaced to allow for a transient insertion of at least one egress structure to provide for a controlled egress of a discrete quantity of a material from the at least one storage region. In addition to the foregoing, other aspects are described in the claims, drawings, and text forming a part of the present disclosure.

Some aspects include a substantially thermally sealed storage container, including one or more segments of ultra efficient insulation material shaped to define at least one substantially temperature-stabilized storage region, at least one region of the one or more segments of ultra efficient insulation material configured for at least one perforation by a perforation device, wherein one or more of the at least one perforation is configured to provide for a controlled egress of a quantity of a material from the at least one storage region, at least one perforation unit external to the container, wherein said at least one perforation unit may move to pierce through the at least one region of the one or more segments of ultra efficient insulation material configured for at least one perforation by a perforation device, at least one perforation unit internal to the container, wherein said at least one perforation unit may move to pierce through the at least one region of the one or more segments of ultra efficient insulation material configured for at least one perforation by a perforation device, and a coupling mechanism, wherein the coupling mechanism may create an interlock between the at least one perforation unit internal to the container and the at least one perforation unit external to the container, thereby creating an egress mechanism for material from the at least one substantially temperature-stabilized storage region. In addition to the foregoing, other aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
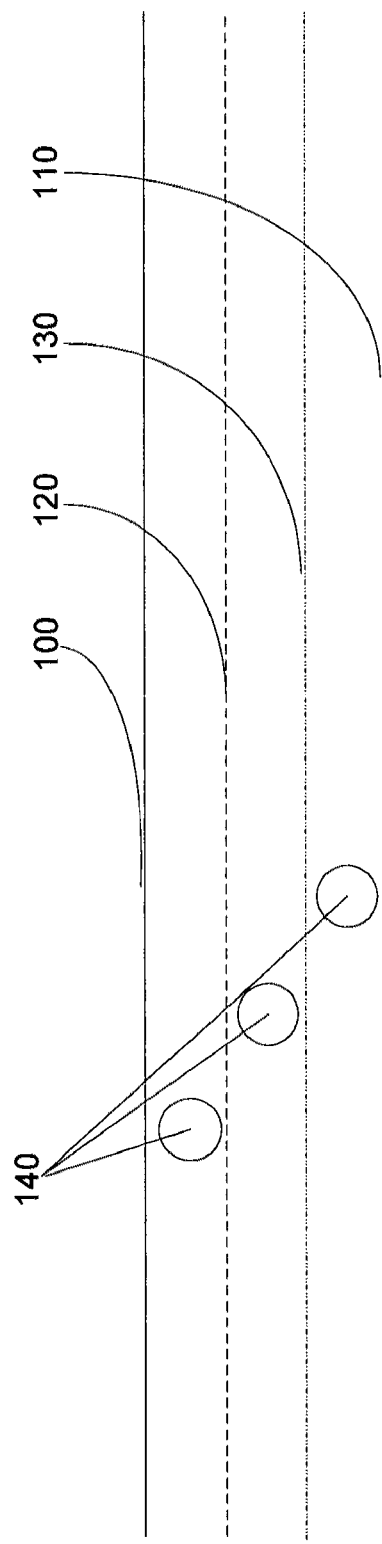
FIG. 1 is a schematic of some aspects of an ultra efficient insulation material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Some embodiments include at least one container, which may include one or more sections of an ultra efficient insulation material. The term "ultra efficient insulation material," as used herein, may include one or more type of insulation material with extremely low heat conductance and extremely low heat radiation transfer between the surfaces of the insulation material. The ultra efficient insulation material may include, for example, one or more layers of thermally reflective film, high vacuum, aerogel, low thermal conductivity bead-like units, disordered layered crystals, low density solids, or low density foam. In some embodiments, the ultra efficient insulation material includes one or more low density solids such as aerogels, such as those described in, for example: Fricke and Emmerling, Aerogels—preparation, properties, applications, Structure and Bonding 77: 37-87 (1992); and Pekala, Organic aerogels from the polycondensation of resorcinol with formaldehyde, Journal of Materials Science 24: 3221-3227 (1989), which are each herein incorporated by reference. As used herein, "low density" may include materials with density from about 0.01 g/cm$^3$ to about 0.10 g/cm$^3$, and materials with density from about 0.005 g/cm$^3$ to about 0.05 g/cm$^3$. In some embodiments, the ultra efficient insulation material includes one or more layers of disordered layered crystals, such as those described in, for example: Chiritescu et al., Ultralow thermal conductivity in disordered, layered WSe$_2$ crystals, Science 315: 351-353 (2007), which is herein incorporated by reference. In some embodiments, the ultra efficient insulation material includes at least two layers of thermal reflective film separated, for example, by at least one of: high vacuum, low thermal conductivity spacer units, low thermal conductivity bead like units, or low density foam. In some embodiments, the ultra efficient insulation material may include at least two layers of thermal reflective material and at least one spacer unit between the layers of thermal reflective material. For example, the ultra-efficient insulation material may include at least one multiple layer insulating composite such as described in U.S. Pat. No. 6,485,805 to Smith et al., titled "Multilayer insulation composite," which is herein incorporated by reference. For example, the ultra-efficient insulation material may include at least one metallic sheet insulation system, such as that described in U.S. Pat. No. 5,915,283 to Reed et al., titled "Metallic sheet insulation system," which is herein incorporated by reference. For example, the ultra-efficient insulation material may include at least one thermal insulation system, such as that described in U.S. Pat. No. 6,967,051 to Augustynowicz et al., titled "Thermal insulation systems," which is herein incorporated by reference. For example, the ultra-efficient insulation material may include at least one rigid multilayer material for thermal insulation, such as that described in U.S. Pat. No. 7,001,656 to Maignan et al., titled "Rigid multilayer material for thermal insulation," which is herein incorporated by reference.

In some embodiments, an ultra efficient insulation material includes at least one material described above and at least one superinsulation material. As used herein, a "superinsulation material" may include structures wherein at least two floating thermal radiation shields exist in an evacuated double-wall annulus, closely spaced but thermally separated by at least one poor-conducting fiber-like material.

In some embodiments, the ultra efficient insulation material includes at least two layers of thermal reflective material separated from each other by magnetic suspension. The layers of thermal reflective material may be separated, for example, by magnetic suspension methods including magnetic induction suspension or ferromagnetic suspension. For more information regarding magnetic suspension systems, see Thompson, Eddy current magnetic levitation models and experiments, IEEE Potentials, February/March 2000, 40-44, and Post, Maglev: a new approach, Scientific American, January 2000, 82-87, which are each incorporated herein by reference. Ferromagnetic suspension may include, for example, the use of magnets with a Halbach field distribution. For more information regarding Halbach machine topologies and related applications, see Zhu and Howe, Halbach permanent magnet machines and applications: a review, IEE Proc.-Electr. Power Appl. 148: 299-308 (2001), which is herein incorporated by reference.

In reference now to FIG. 1, in some embodiments, an ultra efficient insulation material may include at least one multi-layer insulation material. For example, an ultra efficient insulation material may include multilayer insulation material such as that used in space program launch vehicles, including by NASA. See, e.g., Daryabeigi, Thermal analysis and design optimization of multilayer insulation for reentry aerodynamic heating, Journal of Spacecraft and Rockets 39: 509-514 (2002), which is herein incorporated by reference. Some embodiments may include one or more sections of ultra efficient insulation material comprising at least one layer of thermal reflective material and at least one spacer unit adjacent to the at least one layer of thermal reflective material. As illustrated in FIG. 1, an ultra efficient insulation material may include at least two layers of thermal reflective film 120, 130 separated by low thermal conductivity spacer units 140. In some embodiments, one or more sections of ultra efficient insulation material may include at least one layer of thermal reflective material and at least one spacer unit adjacent to the at least one layer of thermal reflective material. The low thermal conductivity spacer units may include, for example, low thermal conductivity bead-like structures, aerogel particles, folds or inserts of thermal reflective film. Although two layers of thermal reflective film are shown in FIG. 1, in some embodiments there may be one layer of thermal reflective film or more than two layers of thermal reflective film. Similarly, there may be greater or fewer numbers of low thermal conductivity spacer units (e.g. 140) depending on the embodiment. In some embodiments there may be one or more additional layers within or in addition to the ultra efficient insulation material, such as, for example, an outer structural layer 100 or an inner structural layer 110. An inner or an outer structural layer may be made of any material appropriate to the embodiment, for example an inner or an outer structural layer may include: plastic, metal, alloy, composite, or glass. In some embodiments, there may be one or more layers of high vacuum between layers of thermal reflective film.

Some embodiments include a substantially thermally sealed storage container that does not include one or more active cooling units. As shown in FIGS. 2, 3, 5 and 6, a substantially thermally sealed storage container may include no active cooling units. The term "active cooling unit", as used herein, includes conductive and radiative cooling mechanisms that require electricity from an external source to operate. For example, active cooling units may include one or more of: actively powered fans, actively pumped refrigerant systems, thermoelectric systems, active heat pump systems, active vapor-compression refrigeration systems and active heat exchanger systems. The external energy required to operate such mechanisms may originate, for example, from municipal electrical power supplies or electric batteries.

Figure 2:
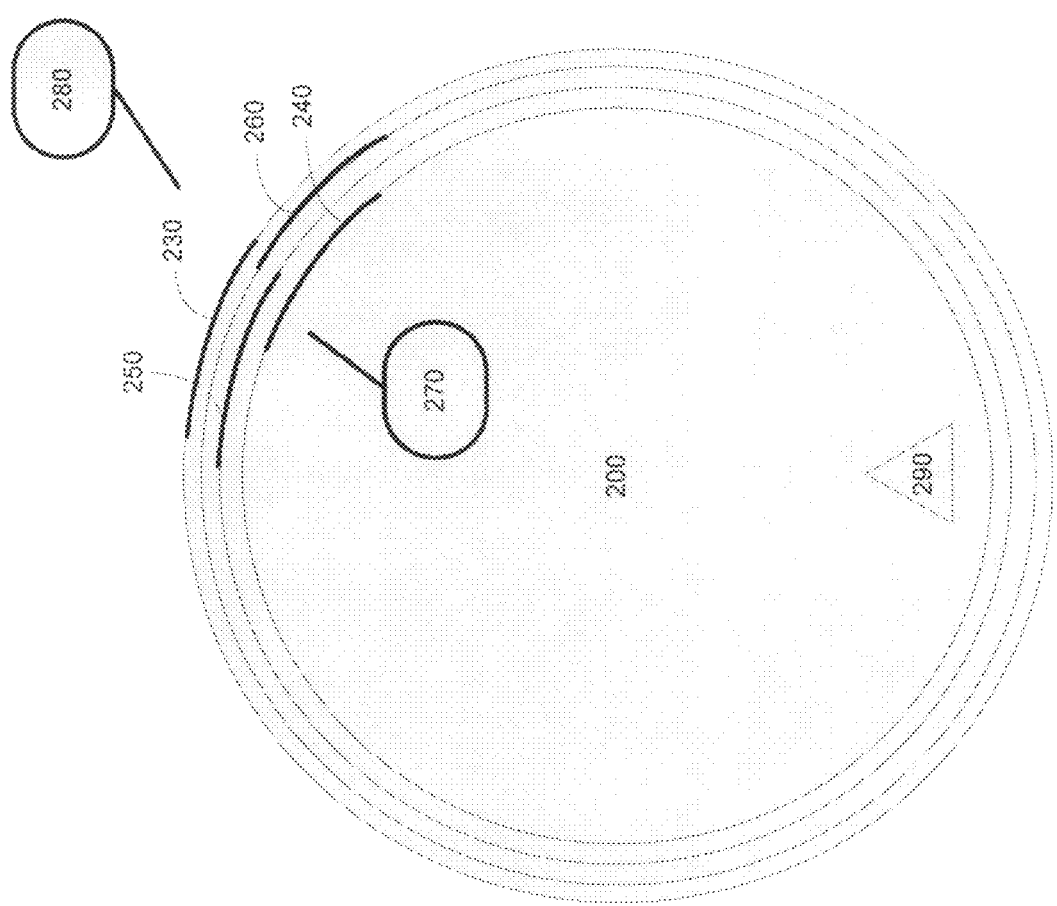
FIG. 2 is a schematic of some aspects of a container.

Some embodiments may include a substantially thermally sealed storage container that does not include one or more heat sink units. In some embodiments, the container may include no heat sink units within the interior. In some embodiments a substantially thermally sealed storage container may include one or more heat sink units thermally connected to one or more of the at least one storage region. For example, as illustrated in FIG. 2, in some embodiments the container may include one or more heat sink units 290 thermally connected to one or more of the at least one storage region 200. The term "heat sink unit", as used herein, includes one or more units that absorb thermal energy. See, for example, U.S. Pat. No. 5,390,734 to Voorhes et al., titled "Heat Sink," U.S. Pat. No. 4,057,101 to Ruka et al., titled "Heat Sink," U.S. Pat. No. 4,003,426 to Best et al., titled "Heat or Thermal Energy Storage Structure," and U.S. Pat. No. 4,976,308 to Faghri titled "Thermal Energy Storage Heat Exchanger," which are each incorporated herein by reference. Heat sink units may include, for example: units containing frozen water or other types of ice; units including frozen material that is generally gaseous at ambient temperature and pressure, such as frozen carbon dioxide ($CO_2$); units including liquid material that is generally gaseous at ambient temperature and pressure, such as liquid nitrogen; units including artificial gels or composites with heat sink properties; units including phase change materials; and units including refrigerants. See, for example: U.S. Pat. No. 5,261,241 to Kitahara et al., titled "Refrigerant," U.S. Pat. No. 4,810,403 to Bivens et al., titled "Halocarbon Blends for Refrigerant Use," U.S. Pat. No. 4,428,854 to Enjo et al., titled "Absorption Refrigerant Compositions for Use in Absorption Refrigeration Systems," and U.S. Pat. No. 4,482,465 to Gray, titled "Hydrocarbon-Halocarbon Refrigerant Blends," which are each herein incorporated by reference.

FIG. 2 depicts some aspects of a substantially thermally sealed storage container. Embodiments may include a container including one or more segments of a first ultra efficient insulation material shaped to define at least one substantially temperature-stabilized storage region, and an access region, including at least one region of the one or more segments of a first ultra efficient insulation material configured for at least one perforation by a perforation device, wherein one or more of the at least one perforation is configured to provide for a controlled egress of a quantity of a material from the at least one storage region. In some embodiments, the one or more segments of a first ultra efficient insulation material may include low thermal conductivity bead-like units. In some embodiments, the one or more segments of a first ultra efficient insulation material may include at least one superinsulation material. In some embodiments, the one or more segments of a first ultra efficient insulation material may include at least two layers of thermal reflective material separated from each other by magnetic suspension. In some embodiments, the one or more segments of a first ultra efficient insulation material may include at least one layer of thermal reflective material, and at least one spacer unit adjacent to the at least one layer of thermal reflective material.

Although, for example, FIGS. 2, 3, 5 and 6 depict a container with a single storage region, in some embodiments there may be a plurality of storage regions. For example, there may be a container wherein the one or more segments of a first ultra efficient insulation material define a plurality of substantially temperature-stabilized storage regions.

A substantially thermally sealed container may include at least one thermally sealable cover external to the at least one region of the one or more segments of a first ultra efficient insulation material configured for at least one perforation by a perforation device, wherein the at least one thermally sealable cover includes a sealing portion positioned for mating to the at least one region of the one or more segments of a first ultra efficient insulation material configured for at least one perforation by a perforation device. For example, a thermally sealable cover may include a sealing portion of a similar size and shape as the at least one region of the one or more segments of a first ultra efficient insulation material configured for at least one perforation by a perforation device. For example, a thermally sealable cover may include a sealing portion that encompasses the at least one region of the one or more segments of a first ultra efficient insulation material configured for at least one perforation by a perforation device. In some embodiments, the thermally sealable cover includes a second ultra efficient insulation material. A first ultra efficient insulation material may be predominately the same as a second ultra efficient insulation material. Some embodiments may include at least one thermally sealable supplemental segment shaped to substantially replace the one or more segments of a first ultra efficient insulation material configured for at least one perforation by a perforation device, wherein the at least one supplemental segment includes a third ultra efficient insulation material. For example, at least one supplemental segment may be of a similar size and shape as the at least one region of the one or more segments of a first ultra efficient insulation material configured for at least one perforation by a perforation device. A first ultra efficient insulation material and a third ultra efficient insulation material may be predominately the same.

As shown in FIG. 2, an access region may include multiple regions 250, 260, of one or more segments of a first ultra efficient insulation material configured for at least one perforation by a perforation device. Some embodiments may include a container with at least one exterior wall and at least one interior wall wherein one or more of the at least one exterior wall and one or more of the at least one interior wall are movable relative to each other. For example, FIG. 2 depicts an exterior wall 230 and an interior wall 240 which are movable relative to each other. In some embodiments, the relative movement of the at least one exterior wall and the at least one interior wall may facilitate access to the at least one storage region. For example, in FIG. 2, the relative movement of an exterior wall 230 and an interior wall 240 may allow the alignment of an access region, including at least one region of one or more segments of ultra-efficient insulation material configured for at least one perforation by a perforation device.

In some embodiments, the multiple regions of at least one region of one or more segments of a first ultra efficient insulation material configured for at least one perforation by a perforation device may be movable relative to each other to provide for alignment of the multiple regions to form an access region. In reference now to FIG. 5, a container 500 may have a rotatable axis 510 which may move to align the regions of ultra efficient insulation material 520, 530, 540 configured for at least one perforation by a perforation device. For example, the multiple regions of ultra efficient insulation material may be aligned via mechanical rotation of the container, gravitational-field induced movement of the multiple regions (e.g. when some portions of the multiple regions are at a different mass then other portions of the container so that the regions tend to align in a particular manner relative to the earth's gravitational field), magnetic-field induced movement of the multiple regions, or other forces.

Figure 6:
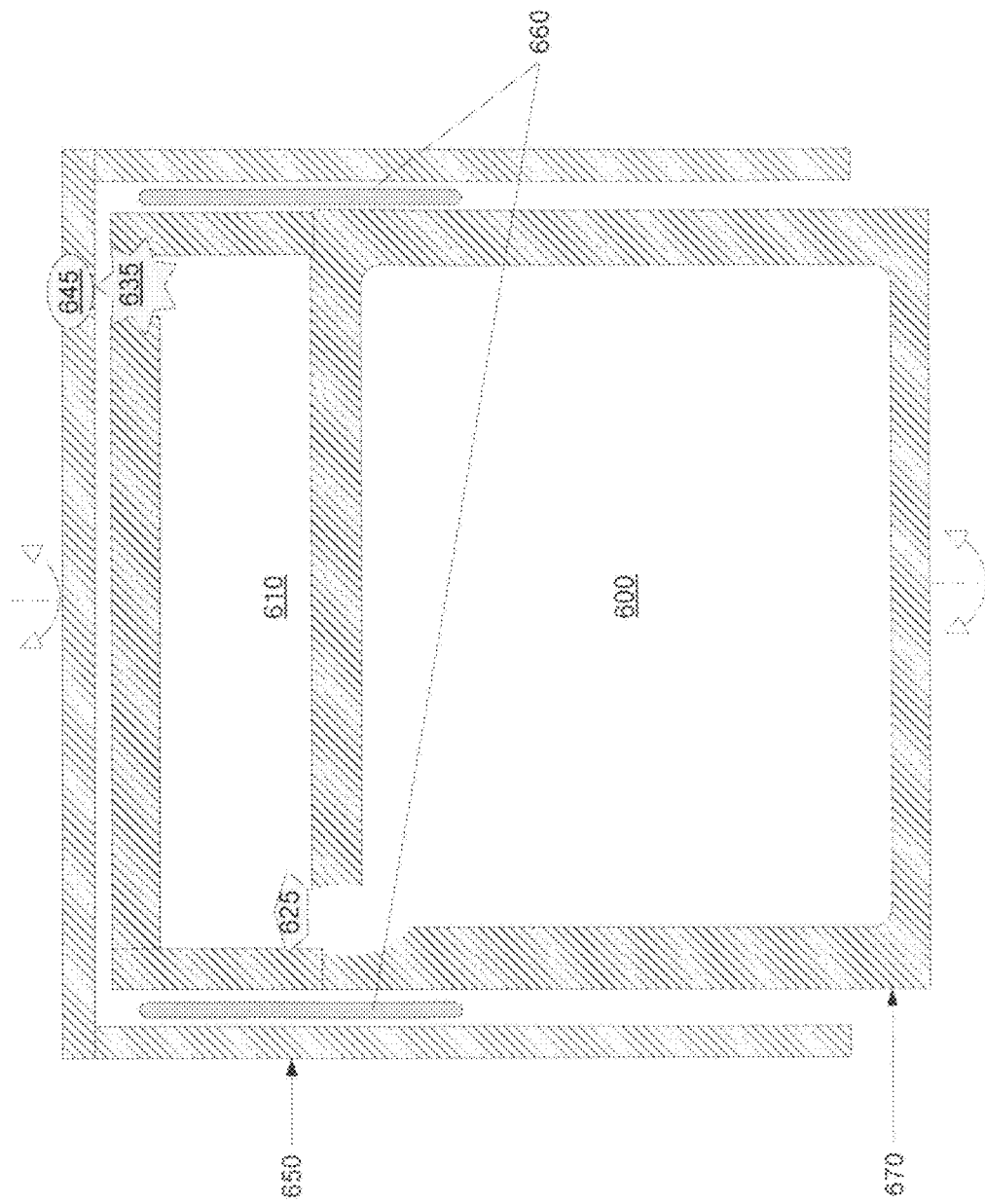
FIG. 6 is a schematic of some aspects of a container.

For example as depicted in FIG. 6, a container including one or more segments of an ultra efficient insulation material 670 shaped to define at least one substantially temperature-stabilized storage region 600 may include a rotatable portion 650 which may move to align regions of ultra efficient insulation material 645, 635 configured for at least one perforation by a perforation device, where one or more of the at least one perforation is configured to provide for a controlled egress of a discrete quantity of a material from the at least one storage region. A rotatable portion 650 may rotate through the mechanical action of rotation-assisting elements 660. The alignment of regions of ultra efficient insulation material 645, 635 configured for at least one perforation by a perforation device may allow for access to an intermediate region of the container 610. As depicted in FIG. 6, in some embodiments a controlled egress structure 625 may be positioned to restrict movement of stored material from storage region 600 to an intermediate region 610. A controlled egress structure 625 may include, for example, a valve, externally-operable closure, flap or other closure structure.

Some embodiments may include one or more markings on an exterior of the container identifying one or more of the at least one region of the one or more segments of a first ultra efficient insulation material configured for at least one perforation by a perforation device. For example, one or more markings may include paint, adhesive-backed paper or plastic, thermally sensitive markings, or other identifying marks. Some embodiments may include a framework attached to an exterior of the container identifying one or more of the at least one region of the one or more segments of a first ultra efficient insulation material configured for at least one perforation by a perforation device. For example, a framework may include a support or alignment structure that facilitates the perforation of the one or more segments of a first ultra efficient insulation material configured for at least one perforation by a perforation device at a desired angle, alignment or orientation.

Some embodiments may include at least one movable perforation unit stored within a storage structure, wherein the at least one perforation unit may move to pierce through the one or more segments of a first ultra efficient insulation material configured for at least one perforation by a perforation device. For example, FIG. 2 depicts a movable perforation device 270 located within storage region 200. Some embodiments may include at least one movable piercing unit stored external to the storage structure, wherein the at least one piercing unit may move to pierce through the at least one region of the one or more segments of a first ultra efficient insulation material which is more easily pierced. For example, FIG. 2 depicts movable perforation unit 280 external to the container. There may be a plurality of movable perforation units stored within the storage structure. At least one perforation unit may be replaceable.

Figure 3:
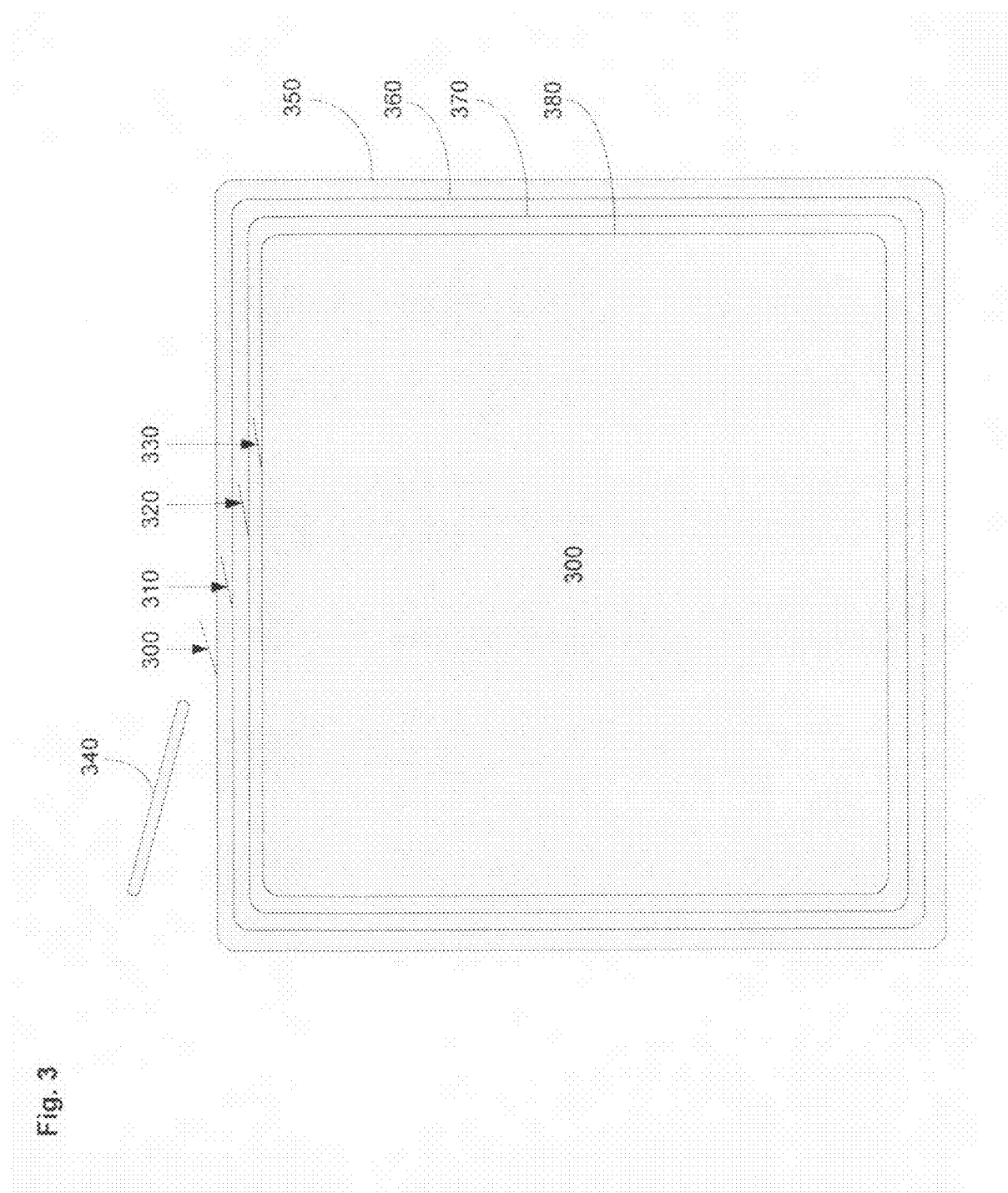
FIG. 3 is a schematic of some aspects of a container.

Some embodiments may include a container including: a storage structure, including one or more segments of ultra efficient insulation material shaped to define at least one substantially temperature-stabilized storage region; and an access structure, including at least one region of the one or more segments of a first ultra efficient insulation material which may be displaced to allow for a transient insertion of at least one egress structure to provide for the controlled egress of a discrete quantity of a material from the at least one storage region. For example, FIG. 3 depicts a segment of ultra efficient insulation material shaped to define at least one substantially temperature-stabilized storage region 300. The ultra efficient insulation material depicted in FIG. 3 includes multiple layers, 350, 360, 370, 380. As depicted in FIG. 3, each layer may include at least one region 300, 310, 320, 330 which may be displaced to allow for the transient insertion of at least one egress structure 340. It may be desirable in some embodiments for the egress structure to be at a particular angle or alignment, for example the angle of egress structure 340 relative to regions that may be displaced 300, 310, 320, 330 depicted in FIG. 3. In some embodiments, the at least one egress structure is a hollow tube-like structure. In some embodiments, the at least one egress structure is configured to include an elongated thermal pathway. For example, the egress structure may have a high aspect ratio. In some embodiments, the at least one region of the one or more segments of ultra efficient insulation material which may be displaced is replaceable.

Some embodiments may include at least one egress structure within the at least one storage region which may be transiently inserted from an interior of the container to an exterior of the container to provide for the controlled egress of a quantity of a material from the at least one storage region. The at least one egress structure within the at least one storage region may be configured to include an elongated thermal pathway for the controlled egress of a quantity of a material from the at least one storage region. For example, the at least one egress structure within the at least one storage region may be configured to include a high aspect ratio. Some embodiments may include at least one egress structure external to the container which may be transiently inserted from an exterior of the container to an interior of the container to provide for the controlled egress of a quantity of a material from the at least one storage region. The at least one egress structure external to the container may be configured to include an elongated thermal pathway for the controlled egress of a quantity of a material from the at least one storage region. For example, the at least one egress structure external to the container may be configured to include a high aspect ratio.

Some embodiments may include at least one thermally-insulated cover including a sealing portion that includes a second ultra efficient insulation material, wherein the sealing portion is positioned for mating to the at least one region of the one or more segments of a first ultra efficient insulation material which may be displaced. Some embodiments may include at least one marking on the exterior of the container indicating at least one region of the one or more segments of a first ultra efficient insulation material which may be displaced. For example, one or more markings may include paint, adhesive-backed paper or plastic, thermally sensitive markings, or other identifying marks. Some embodiments may include a framework attached to the exterior of the container indicating the at least one region of the one or more segments of a first ultra efficient insulation material which may be displaced. For example, a framework may include a support or alignment structure that facilitates the perforation of the one or more segments of a first ultra efficient insulation material configured for at least one perforation by a perforation device at a desired angle, alignment or orientation.

Figure 5:
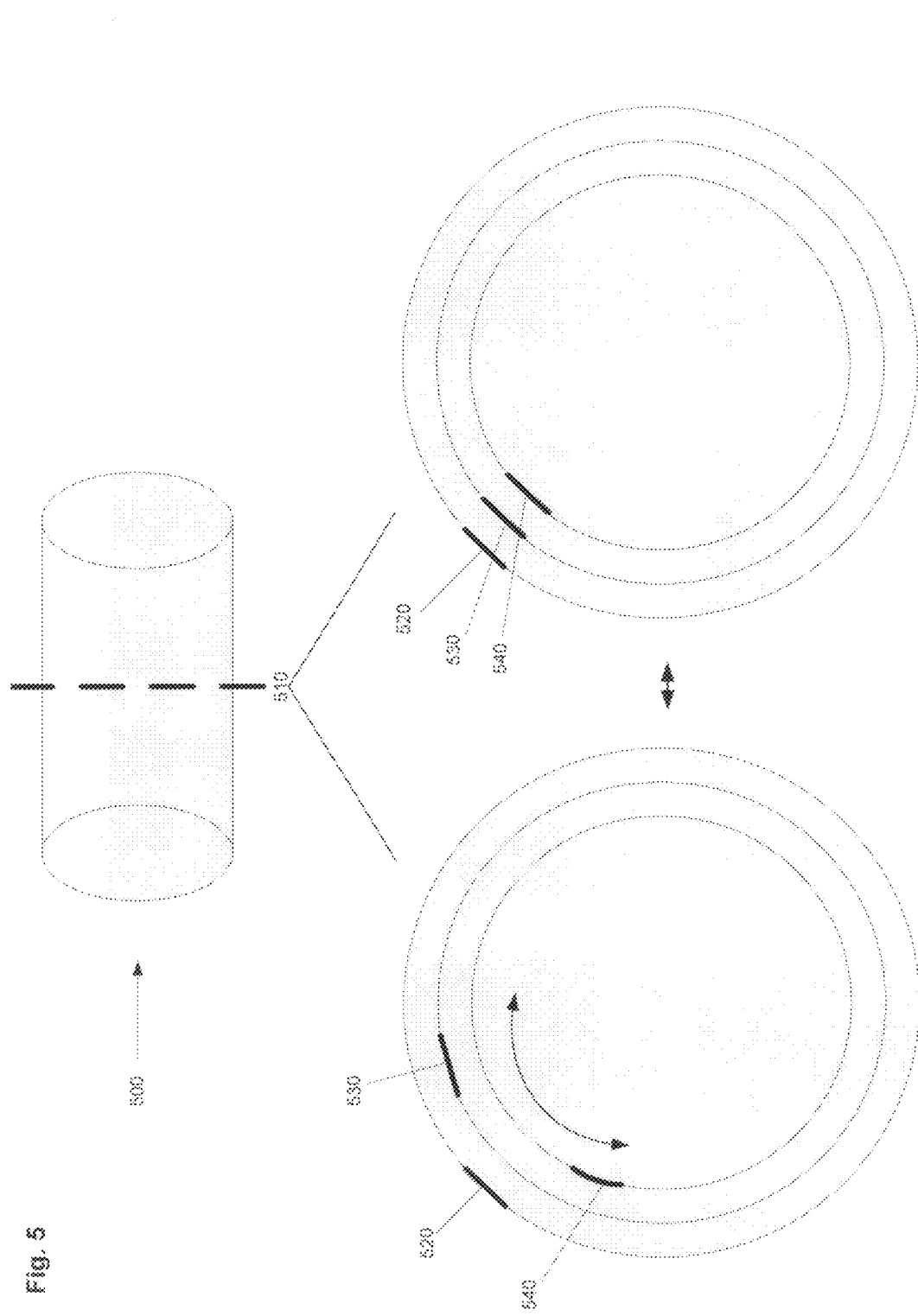
FIG. 5 is a schematic of some aspects of a container.

Some embodiments may include a container including an exterior wall, and an interior wall, wherein the interior wall and the exterior wall are movable relative to each other, and the relative movement of the exterior wall to the interior wall alters the accessibility of one or more of the at least one region of the one or more segments of a first ultra efficient insulation material which may be displaced. For example, FIG. 5 depicts a container 500 with a radius of rotation 510 which allows for the relative movement of an exterior wall 520 and an interior wall 540.

Some embodiments may include a substantially thermally sealed storage container, including one or more segments of ultra efficient insulation material shaped to define at least one substantially temperature-stabilized storage region, at least one region of the one or more segments of ultra efficient insulation material configured for at least one perforation by a perforation device, wherein one or more of the at least one perforation is configured to provide for a controlled egress of a quantity of a material from the at least one storage region, at least one perforation unit external to the container, wherein said at least one perforation unit may move to pierce through the at least one region of the one or more segments of ultra efficient insulation material configured for at least one perforation by a perforation device, at least one perforation unit internal to the container, wherein said at least one perforation unit may move to pierce through the at least one region of the one or more segments of ultra efficient insulation material configured for at least one perforation by a perforation device, and a coupling mechanism, wherein the coupling mechanism may create an interlock between the at least one perforation unit internal to the container and the at least one perforation unit external to the container, thereby creating an egress mechanism for material from the at least one substantially temperature-stabilized storage region.

Figure 4:
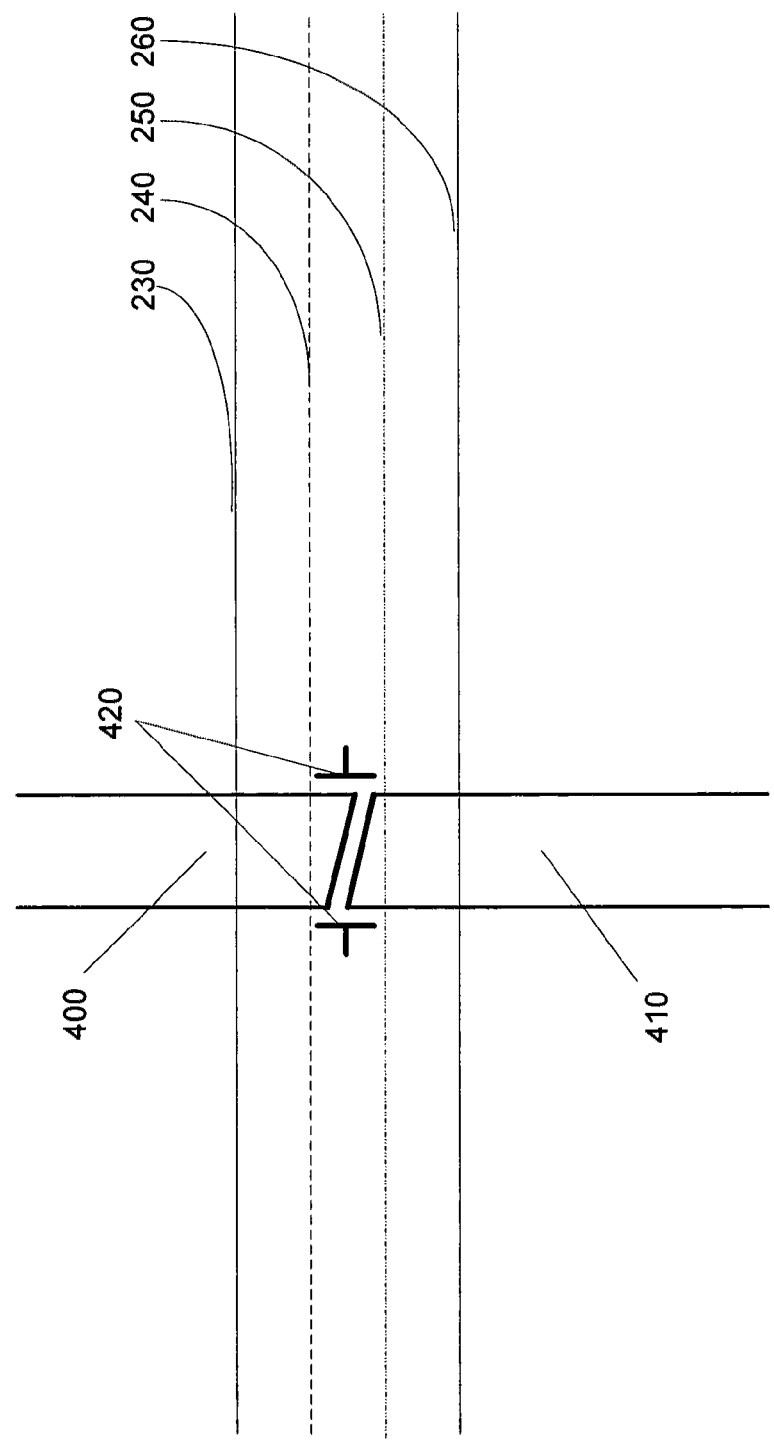
FIG. 4 is a schematic of some aspects of an access structure.

For example, FIGS. 2 and 4 depict a region of ultra efficient insulation material including layers 230, 240, 250, and 260. As depicted in FIG. 4, a perforation unit originally external to the container 400 and a piercing unit originally internal to the container 410 may combine between layers 440, 450 to create an interlock structure including a coupling mechanism 420. In some embodiments, the coupling mechanism may be located within the ultra efficient insulation material as depicted in FIG. 4, while in other embodiments the coupling mechanism may be otherwise located internal to the container or external to the container. In some embodiments, there may be components of the coupling mechanism located within the layers of ultra efficient insulation material, while in other embodiments the perforation units may create the coupling mechanism without additional components. For example, some embodiments may include perforation units that are shaped or sized to fit together and thereby create an interlock or an access device.

Some embodiments may include one or more interlocks. As used herein, an "interlock" includes at least one connection between regions, such as a connection that limits the movement of stored material from at least one storage region. For example, an interlock may restrict egress of a discrete quantity of a material from at least one storage region. For example, an interlock may act to restrict the egress of a stored unit from a storage region until another previously-stored unit egresses from the container. For example, an interlock may act to allow the egress of only a fixed quantity of stored material or storage units from a storage region during a period of time. Interlocks may be mechanically operable interlocks. For example, mechanically operable interlocks may include at least one of: electrically actuated mechanically operable interlocks, electromagnetically operable interlocks, magnetically operable interlocks, mechanically actuated interlocks, ballistically actuated interlocks, dynamically actuated interlocks, centrifugally actuated interlocks, optically actuated interlocks, orientationally actuated interlocks, thermally actuated interlocks, or gravitationally actuated interlocks. In some embodiments, at least one of the one or more interlocks may operate independently of an electrical power source. An electrical power source may originate, for example, from municipal electrical power supplies, an electrical generator device, or electric batteries. In some embodiments, at least one of the one or more interlocks includes at least one magnet. For example, portions of an interlock may come together and remain in a desired orientation due to magnetic force from magnets located on more than one region or component of the interlock. In some embodiments, at least one of the one or more interlocks is gravity controlled, such as, for example, where mass differences in the interlock components control the opening and closing of the interlock depending on the orientation of the interlock in the earth's gravitational field.

In some embodiments, the coupling mechanism may include a mechanical coupling unit. In some embodiments, the coupling mechanism may include a magnetic coupling unit. For example, a magnetic coupling unit may include magnets on each of the perforation units, so that the piercing units are attracted to each other. In some embodiments, the coupling mechanism may uncouple. For example, the perforation units may be retractable so that the coupling mechanism may uncouple and the interlock may be transitory. In some embodiments, the coupling mechanism may control egress of a discrete quantity of material from one or more of the at least one storage region. For example, the coupling mechanism may include structure that restricts the egress of units from one or more of the at least one storage region. For example, the coupling mechanism may include structure such as a valve that restricts the flow rate of liquid from one or more storage region. For example, the coupling mechanism may include structure that restricts the transfer rate of discrete units of material from one or more storage region, such as a flap, compression region, selective aperture, turnstile or other structure. In some embodiments, the at least one perforation unit external to the container is shaped to include an elongated thermal pathway for the controlled egress of material from the at least one storage region. For example the at least one perforation unit external to the container may include a high aspect ratio. In some embodiments, the at least one perforation unit internal to the container is shaped to include an elongated thermal pathway for the controlled egress of material from the at least one storage region. For example the at least one perforation unit internal to the container may include a high aspect ratio.

In reference now to FIG. 5, a container 500 may have a rotatable axis 510 which may move to align at least one region of ultra efficient insulation material 530 which may be perforated by a perforation device with regions of an external wall 520 and an internal wall 540 which may be perforated. For example, the regions may be aligned through gravitational force, magnetic force, mechanical force, or other mechanisms. In some embodiments, some of the regions may be inherently aligned, and only some of the regions aligned as required for piercing and access to one or more storage region. For example, regions 530, 540 may be already in alignment and region 520 may be rotated to fully align the regions. In some embodiments, the container may be rotated back to a non-aligned configuration by the same or a different means than the rotation into alignment.

In reference now to FIG. 6, a container with a storage region 600 may include a relatively rotatable portion 650 which may move to align regions of ultra efficient insulation material 645, 635 that may be pierced. Note that the regions that may be pierced 645, 635 may include the same or different material from each other. The relatively rotatable portion 650 may be connected to the relatively fixed portion of the container via thermally insulated rotation regions 660. For example, the thermally insulated rotation regions may include low thermal conductivity bead-like units or low thermal conductivity solids in a structure that allows rotation. The thermally insulated rotation regions may provide virtually zero heat conductance and virtually zero heat radiation transfer between substantially thermally sealed storage regions. The thermally insulated rotation regions may include any material appropriate to the embodiment, for example: glues; adhesives; fasteners; welds; at least one layer of an ultra efficient insulation material; or at least one layer of a super-insulation material. In some embodiments, one or more regions of thermally insulated rotation regions may include physical structure to encourage at least one rotatable connection between one or more segments of first ultra efficient insulation material and one or more segments of second ultra insulator material, for example ridges, notches, strips, tongues, ribs, grooves or indentations on the one or more segments of first ultra efficient insulation material which mate with ridges, notches, strips, tongues, ribs, grooves or indentations on the one or more segments of second ultra insulation material to form at least one rotatable connection. In some embodiments, the rotation of the container to align regions that may be pierced 645, 635 may allow access to an intermediate portion of the container 610. An intermediate portion of the container 610 may have an access opening 620 to one or more storage regions 600. In some embodiments, the access opening 620 may be closed through an interlock or closing mechanism 625.

In some embodiments, a container includes at least one layer of nontoxic material on an interior surface of one or more of the at least one storage region. Nontoxic material may include, for example, material that does not produce residue that may be toxic to the contents of the at least one substantially temperature-stabilized storage region, or material that does not produce residue that may be toxic to the future users of contents of the at least one substantially temperature-stabilized storage region. Nontoxic material may include material that maintains the chemical structure of the contents of the at least one substantially temperature-stabilized storage region, for example nontoxic material may include chemically inert or non-reactive materials. Nontoxic material may include material that has been developed for use in, for example, medical, pharmaceutical or food storage applications. Nontoxic material may include material that may be cleaned or sterilized, for example material that may be irradiated, autoclaved, or disinfected. Nontoxic material may include material that contains one or more antibacterial, antiviral, antimicrobial, or antipathogen agents. For example, nontoxic material may include aldehydes, hypochlorites, oxidizing agents, phenolics, quaternary ammonium compounds, or silver. Nontoxic material may include material that is structurally stable in the presence of one or more cleaning or sterilizing compounds or radiation, such as plastic that retains its structural integrity after irradiation, or metal that does not oxidize in the presence of one or more cleaning or sterilizing compounds. Nontoxic material may include material that consists of multiple layers, with layers removable for cleaning or sterilization, such as for reuse of the at least one substantially thermally sealed storage region. Nontoxic material may include, for example, material including metals, composites, fabrics, papers or plastics.

In some embodiments, a container includes at least one layer including at least one metal on an interior surface of one or more of the at least one storage region. For example, the at least one metal may include gold, aluminum, copper, or silver. The at least one metal may include at least one metal composite or alloy, for example steel, stainless steel, metal matrix composites, gold alloy, aluminum alloy, copper alloy, or silver alloy. In some embodiments, the at least one metal includes metal foil, such as titanium foil, aluminum foil, silver foil, or gold foil. A metal foil may be a component of a composite, such as, for example, in association with polyester film, such as polyethylene terephthalate (PET) polyester film. The at least one layer including at least one metal on the interior surface of at least one substantially temperature-stabilized storage region may include at least one metal that may be sterilizable or disinfected. For example, the at least one metal may be sterilizable or disinfected using plasmons. For example, the at least one metal may be sterilizable or disinfected using autoclaving, thermal means, or chemical means. Depending on the embodiment, the at least one layer including at least one metal on the interior surface of at least one substantially temperature-stabilized storage region may include at least one metal that has specific heat transfer properties, such as thermal radiative properties.

In some embodiments, the container includes one or more removable inserts within the interior of one or more of the at least one storage region. The removable inserts may be made of any material appropriate for the embodiment, including nontoxic materials, metal, alloy, composite, or plastic. The one or more removable inserts may include inserts that may be reused or reconditioned. The one or more removable inserts may include inserts that may be cleaned, sterilized, or disinfected as appropriate to the embodiment.

In some embodiments, there may be a storage container including a plurality of storage regions within the container. Some or all of the storage regions may be substantially temperature-stabilized storage regions. The plurality of storage regions may be, for example, of comparable size and shape or they may be of differing sizes and shapes as appropriate to the embodiment. Different storage regions may include, for example, various removable inserts, at least one layer including at least one metal on the interior surface of a storage region, or at least one layer of nontoxic material on the interior surface, in any combination or grouping.

Some embodiments may include a container including at least one temperature indicator. For example, at least one temperature indicator may be located within one or more of the at least one substantially temperature-stabilized storage region, at least one temperature indicator may be located exterior to the container, or at least one temperature indicator may be located within the structure of the container. In some embodiments, multiple temperature indicators may be located in multiple positions. Temperature indicators may include temperature indicating labels, which may be reversible or irreversible. See, for example, the Environmental Indicators sold by ShockWatch Company, with headquarters in Dallas Tex., the Temperature Indicators sold by Cole-Palmer Company of Vernon Hills Ill. and the Time Temperature Indicators sold by 3M Company, with corporate headquarters in St. Paul Minn., the brochures for which are each hereby incorporated by reference. Temperature indicators may include time-temperature indicators, such as those described in U.S. Pat. Nos. 5,709,472 and 6,042,264 to Prusik et al., titled "Time-temperature indicator device and method of manufacture" and U.S. Pat. No. 4,057,029 to Seiter, titled "Time-temperature indicator," which are each herein incorporated by reference. Temperature indicators may include, for example, chemically-based indicators, temperature gauges, thermometers, bimetallic strips, or thermocouples.

In some embodiments, the container may include one or more sensors. At least one sensor may be located within one or more of the at least one substantially temperature-stabilized storage region, at least one sensor may be located exterior to the container, or at least one sensor may be located within the structure of the container. In some embodiments, multiple sensors may be located in multiple positions. In some embodiments, the one or more sensors includes at least one sensor of a gaseous pressure within one or more of the at least one storage region, sensor of a mass within one or more of the at least one storage region, sensor of a stored volume within one or more of the at least one storage region, sensor of a temperature within one or more of the at least one storage region, or sensor of an identity of an item within one or more of the at least one storage region. In some embodiments, at least one sensor may include a temperature sensor, such as, for example, chemical sensors, thermometers, bimetallic strips, or thermocouples. A container may include one or more sensors such as a physical sensor component such as described in U.S. Pat. No. 6,453,749 to Petrovic et al., titled "Physical sensor component", which is herein incorporated by reference. A container may include one or more sensors such as a pressure sensor such as described in U.S. Pat. No. 5,900,554 to Baba et al., titled "Pressure sensor", which is herein incorporated by reference. A container may include one or more sensors such as a vertically integrated sensor structure such as described in U.S. Pat. No. 5,600,071 to Sooriakumar et al., titled "Vertically integrated sensor structure and method", which is herein incorporated by reference. A container may include one or more sensors such as a system for determining a quantity of liquid or fluid within a container, such as described in U.S. Pat. No. 5,138,559 to Kuehl et al., titled "System and method for measuring liquid mass quantity", U.S. Pat. No. 6,050,598 to Upton, titled "Apparatus for and method of monitoring the mass quantity and density of a fluid in a closed container, and a vehicular air bag system incorporating such apparatus", and U.S. Pat. No. 5,245,869 to Clarke et al., titled "High accuracy mass sensor for monitoring fluid quantity in storage tanks", which are each herein incorporated by reference. A container may include one or more sensors of radio frequency identification ("RFID") tags to identify material within the at least one substantially thermally sealed storage region. RFID tags are well known in the art, for example in U.S. Pat. No. 5,444,223 to Blama, titled "Radio frequency identification tag and method", which is herein incorporated by reference.

In some embodiments, a container may include one or more communications devices. The one or more communications devices, may include, for example, one or more recording devices, one or more transmission devices, one or more display devices, or one or more receivers. Some embodiments may include communications devices on the exterior of the container, including devices attached to the exterior of the container, devices adjacent to the exterior of the container, or devices located at a distance from the exterior of the container. Some embodiments may include communications devices located within the structure of the container. Some embodiments may include communications devices located within at least one of the one or more substantially temperature-stabilized storage regions. Some embodiments may include at least one display device located at a distance from the container, for example a display located at a distance operably linked to at least one sensor. Some embodiments may include more than one type of communications device, and in some embodiments the devices may be operably linked. For example, some embodiments may contain both a receiver and an operably linked transmission device, so that a signal may be received by the receiver which then causes a transmission to be made from the transmission device. Some embodiments may include more than one type of communications device that are not operably linked. For example, some embodiments may include a transmission device and a display device, wherein the transmission device is not linked to the display device.

In some embodiments, there may be at least one region within the interior of a container that is at a higher gaseous pressure than the atmospheric pressure external to the container. In some embodiments, there may be at least one compartment within one or more of the at least one substantially temperature-stabilized storage region, wherein the at least one compartment is at a higher gaseous pressure than the exterior atmospheric pressure of the container. For example, in reference to FIG. 2, the gaseous pressure in a substantially temperature-stabilized storage region 200, may be at a higher gaseous pressure than the atmospheric pressure external to the container. For example, a region of higher gaseous pressure may include a sealed region with inherently higher gaseous pressure. For example, a region of higher gaseous pressure may include at least one substantially temperature-stabilized storage region 200 including positive gaseous pressure relative to the atmospheric pressure external to the container. For example, a region of higher gaseous pressure may include at least one substantially temperature-stabilized storage region 200 including one or more sealed storage units with interior positive gaseous pressure relative to the atmospheric pressure external to the container. In some embodiments, there may be at least one region within the interior of the container that is at a lower atmospheric pressure than the atmospheric pressure external to the container. For example, in reference to FIG. 2, the gaseous pressure in a substantially temperature-stabilized storage region 200 may be at a lower gaseous pressure than the atmospheric pressure external to the container. For example, a region of lower gaseous pressure may include at least one substantially temperature-stabilized storage region 200 including negative gaseous pressure relative to the atmospheric pressure external to the container. For example, a region of lower gaseous pressure may include at least one substantially temperature-stabilized storage region 200 including one or more sealed storage units with interior negative gaseous pressure relative to the atmospheric pressure external to the container.

In some embodiments, a storage container includes at least one authentication device. An authentication device may be operably coupled to one or more communications devices, sensors, or access mechanisms. For example, an authentication device may include a device which may be authenticated with a key, or a device that may be authenticated with a code, such as a password or a combination. For example, an authentication device may include a device that may be authenticated using biometric parameters, such as fingerprints, retinal scans, hand spacing, voice recognition or biofluid composition (e.g. blood, sweat, or saliva).

In some embodiments, a container includes at least one logging device. A logging device may be operably coupled to one or more communications devices, sensors, perforation devices or access mechanisms. For example, a logging device may include a record of authentication via the authentication device, such as a record of times of authentication, operation of authentication or individuals making the authentication. For example, a logging device may record that an authentication device was authenticated with a specific code which identifies a specific individual at one or more specific times. For example, a logging device may record egress of a quantity of a material from one or more of at least one storage region, such as recording that some quantity or units of material egressed at a specific time. For example, a logging device may record information from one or more sensors, one or more temperature indicators, or one or more communications devices.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific example herein is also intended to be representative of its class, and the non-inclusion of such specific components (e.g., steps), devices, and objects herein should not be taken as indicating that limitation is desired. Furthermore, the use of particular shapes within a Figure herein is not intended to connote a shape of any particular element. For example, the use of a triangle shape for element 290 in FIG. 2 should not be interpreted as meaning that the element 290 in practice should be triangle-shaped.

All of the above U.S. patents, U.S. patent application publications, U.S. patent applications, foreign patents, foreign patent applications and non-patent publications referred to in this specification or listed in any Application Data Sheet, are incorporated herein by reference, to the extent not inconsistent herewith.

In addition to the foregoing, other system aspects are described in the claims, drawings, and text forming a part of the present disclosure.

With respect to the use of substantially any plural or singular terms herein, those having skill in the art can translate from the plural to the singular or from the singular to the plural as is appropriate to the context or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

EXAMPLES

Example 1

A container with an access region and constructed with ultra efficient insulation material may be used to maintain a liquid or beverage at a specific temperature. A liquid or beverage might include water or flavored water, dairy product or fruit juice, carbonated soda, wine, beer or distilled spirits, for example. A specific temperature may be that at which the liquid or beverage is best stored, for example, for long term aging. For example, a container with an access region and constructed with ultra efficient insulation material may be used to store wine at an optimal storage temperature range of 50 to 55° F. (10-12° C.). Similarly, a container with an access region and constructed with ultra efficient insulation material may be used to store beer at a storage temperature range of 45-65° F. Alternatively, a specific temperature may be that at which a liquid or beverage is preferably served. For example, a container with an access region and constructed with ultra efficient insulation material may store a beverage in a temperature range of 37-40° F. (3-4.5° C.), comparable to a standard refrigerator. Alternatively, a container with an access region and constructed with ultra efficient insulation material may store a beverage such as beer, for example, at a temperature appropriate for serving depending upon the type of beer, ranging for example from 37 to 53° F. (3-12° C.). A container with an access region and constructed with ultra efficient insulation material may also be used to maintain an optimal temperature for other perishable liquids including, for example, cooking oil, syrup, vinegar, salad dressing, and other condiments. As such, the liquid or beverage may be directly packaged into the temperature stabilized storage container. Controlled egress of fluid from the container with an access region and constructed with ultra efficient insulation material is managed by an internal or external piercing unit, or a combination, as described herein.

Example 2

A container with an access region and constructed with ultra efficient insulation material may be used to maintain water at or just below boiling temperature of 212° F./100° C. In some settings, the water may be sterilized. Boiling water may be used for heating and cooking a variety of ready to eat items such as, for example, beverages including coffee, tea, hot chocolate, and cider, and foods including dehydrated foods and instant soup, noodles, and oatmeal. As such, the container with an access region and constructed with ultra efficient insulation material may dispense water through a thermally insulated piercing unit, for example, at or near boiling in an emergency situation or remote setting, for example, where the capacity to heat water by other means is unavailable or limited.

Example 3

A container with an access region and constructed with ultra efficient insulation material may be used to maintain small, granular food items at an optimal temperature and humidity. Granular food items might include, for example, sugar, flour and other milled grains, salt, spices, rice, oats and other grains. As such, a container with an access region and constructed with ultra efficient insulation material may be used in a warm and/or humid environment such as, for example, the tropics to optimally store small granular food items.

Example 4

A container with an access region and constructed with ultra efficient insulation material may be also be used to maintain small, granular food items below the freeze point (generally 0° C./32° F.). For example, a container with an access region and constructed with ultra efficient insulation material may be used to increase the shelf life, for example, of fresh food items. In this instance, a fresh food item might include vegetables, such as peas or corn kernels, and fruits, such as blueberries or other small berries. Alternatively, a container with an access region and constructed with ultra efficient insulation material may be used to maintain the temperature of a frozen dessert such as, for example, small frozen ice cream or yogurt pellets. As such, the container with an access region and constructed with ultra efficient insulation material may hold one or more single serving units of the food item. The container with an access region and constructed with ultra efficient insulation material may contain one or more communications or sensor devices such as internal thermometers or thermostats that indicate whether or not the contents maintain proper temperature during the course of storage.

Example 5

A container with an access region and constructed with ultra efficient insulation material may be used to keep fluids intended for intravenous administration at or slightly above body temperature. In the medical or surgical setting, for example, a container with an access region and constructed with ultra efficient insulation material may be used to hold artificial plasma or other blood product at appropriate temperature for immediate use. For example, plasma substitutes such as hydroxylethyl starch (HES) are often administered rapidly to patients with hypovolemia and for hemodilutional autotransfusion (HAT) during surgery and anesthesia (Yamakage et al. Safety and beneficial effect on body core temperature of prewarmed plasma substitute hydroxyethyl starch during anesthesia, Anesthesiology (2004) 101:A1285, which is herein incorporated by reference). Addition of these agents at room temperature may result in a drop in the patient's core temperature and as such are best administered at or slightly above body temperature. HES has been shown to be stable at 40° C. for at least 3 months. As such, a blood product such as HES, for example, may be stored at 40° C. in a container with an access region and constructed with ultra efficient insulation material in sterile 500 ml units, for example, until needed in a medical or surgical setting.

Example 6

Alternatively, a container with an access region and constructed with ultra efficient insulation material may be used to maintain units of intravenous (IV) solution at or slightly above body temperature (generally 98.6° F./37° C.). For example, a temperature stabilized storage container may hold one or more units of IV solution containing dextrose or saline for use, for example, in treating dehydration associated with hypothermia. As the core temperature of a hypothermic individual is already below normal, addition of intravenous fluids should optimally be performed at body temperature to prevent further cooling (Department of Health & Social Services, State of Alaska, Cold Injuries Guidelines Revised version 2005, which is herein incorporated by reference). As such, container with an access region and constructed with ultra efficient insulation material containing 250 to 500 ml units of a prewarmed rehydration solution may be used, for example, by first responders in the field such as a paramedic, an emergency medical technician, search and rescue, coast guard, or military personnel. In some embodiments, a container with an access region and constructed with ultra efficient insulation material containing IV solution may include connections to join directly to an IV apparatus for infusion into an individual in need thereof.

Example 7

A container with an access region and constructed with ultra efficient insulation material under pressure may be used to maintain humidified air or oxygen in the range of 43-45° C. (107-122° F.), for example. In a hypothermic individual, loss of heat during respiration may account for 10% to 30% of the body's heat loss, particularly under conditions in which the ambient air temperature is cold. As such, inhalation of warm, water-saturated air is a non-invasive treatment suitable for active core rewarming in the field and donates heat directly to the head, neck, and thoracic core, warming the hypothalamus, the temperature regulation center, the respiratory center, and the cardiac center at the base of the brainstem. (Department of Health & Social Services, State of Alaska, Cold Injuries Guidelines Revised version 2005, which is herein incorporated by reference). In many cases, this rewarming of the central nervous system at the brainstem reverses the cold-induced depression of the respiratory centers and improves the level of consciousness. Alternatively, a container with an access region and constructed with ultra efficient insulation material may contain water ranging in temperature, for example, from 99 to 212° F. (37-100° C.) that may be used in conjunction with a face mask to provide prewarmed, humidified air to a hypothermic individual. For example, inhaled ambient air may be passed over steaming, prewarmed water prior to entering an individual's lungs. As such, a container with an access region and constructed with ultra efficient insulation material may dispense prewarmed water to an external vessel attached to the breathing apparatus. Alternatively, the piercing unit itself may be connected to a breathing apparatus.

Example 8

A container with an access region and constructed with ultra efficient insulation material may be used to maintain water, for example, at a temperature appropriate for bathing or cleaning dishes, clothes, and/or equipment in the field. For example, a container with an access region and constructed with ultra efficient insulation material may contain water at a temperature range of 80 to 100° F. for a "field shower" for use by military, forest service, or first responders, for example, in an emergency following exposure to a hazardous chemical or agent.

Example 9

A container with an access region and constructed with ultra efficient insulation material may be used to maintain a non-edible liquid at a specific temperature to facilitate immediate use. For example, a container with an access region and constructed with ultra efficient insulation material may contain ready to use hot mix asphalt maintained within an optimal spreading temperature range of 280 to 300° F. Hot mix asphalt is routinely used for large paving projects and is manufactured at a local hot mix asphalt facility and delivered to the paving site already warm and ready to be used. As such, hot mix asphalt maintained at temperature in a container with an access region and constructed with ultra efficient insulation material may be used in those situations in which a local hot mix asphalt facility is not available, for example after damage to a road or an airfield in a remote location, disaster area and/or war zone. Alternatively, hot mix asphalt maintained at temperature in a container with an access region and constructed with ultra efficient insulation material may be used for a patching project or projects requiring immediate attention by a road or airstrip crew. Optionally, a container with an access region and constructed with ultra efficient insulation material may be used to maintain new formulations of asphalt such as, for example, warm mix asphalt at temperature ranges of 160-180° F. (Suttmeier, Warm mix asphalt: a cooler alternative (2006) Material Matters, Spring:21-22, which is herein incorporated by reference).

Example 10

A container with an access region and constructed with ultra efficient insulation material may be used to maintain a solution of deicing material, such as, for example, ethylene glycol, propylene glycol, salt solutions, urea solutions, or a combination thereof at a temperature appropriate to facilitate removal of ice, snow and/or frost. Propylene glycol is capable of lowering the freezing point of water to about −60° C. and is a common component of solutions used to deice airplanes, for example. Propylene glycol in combination with water and additional salts and/or urea is usually sprayed on hot, in a temperature range of 150 to 180° F., and at high pressure. A small amount of deicing material, for example 25-50 gallons, may be used on an otherwise dry, cold day to warm fuel tanks. Alternatively, a much as 1700 gallons of deicing material have been reportedly used per plane during heavy snow fall. As such, a container with an access region and constructed with ultra efficient insulation material may contain and dispense 25-50 gallons, for example, of prewarmed deicing material for minimal deicing of a plane. Alternatively, a container with an access region and constructed with ultra efficient insulation material may be configured to dispense a large volume or multiple small volume units of deicing material, as appropriate for the conditions.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A substantially thermally sealed storage container, comprising:
    one or more segments of ultra efficient insulation material shaped to define at least one substantially temperature-stabilized storage region;
    at least one region of the one or more segments of ultra efficient insulation material configured for at least one perforation by a perforation device, wherein one or more of the at least one perforation is configured to provide for a controlled egress of a quantity of a material from the at least one storage region;
    at least one perforation unit external to the container, wherein said at least one perforation unit may move to pierce through the at least one region of the one or more segments of ultra efficient insulation material configured for at least one perforation by a perforation device;
    at least one perforation unit internal to the container, wherein said at least one perforation unit may move to pierce through the at least one region of the one or more segments of ultra efficient insulation material configured for at least one perforation by a perforation device; and
    a coupling mechanism, wherein the coupling mechanism may create an interlock between the at least one perforation unit internal to the container and the at least one perforation unit external to the container, thereby creating an egress mechanism for material from the at least one substantially temperature-stabilized storage region.

2. The container of claim 1, wherein the container does not include one or more active cooling units.

3. The container of claim 1, wherein the one or more segments of ultra efficient insulation material include low thermal conductivity bead-like units.

4. The container of claim 1, wherein the one or more segments of ultra efficient insulation material include at least one superinsulation material.

5. The container of claim 1, wherein the one or more segments of ultra efficient insulation material include at least two layers of thermal reflective material separated from each other by magnetic suspension.

6. The container of claim 1, wherein the one or more segments of ultra efficient insulation material include:
    at least one layer of thermal reflective material; and
    at least one spacer unit adjacent to the at least one layer of thermal reflective material.

7. The container of claim 1, wherein the coupling mechanism includes at least one mechanical coupling unit.

8. The container of claim 1, wherein the coupling mechanism includes at least one magnetic coupling unit.

9. The container of claim 1, comprising:
    at least one temperature indicator.

10. The container of claim 1, comprising:
    one or more sensors.

11. The container of claim 1, comprising:
    one or more communications devices.

12. The container of claim 1, wherein the at least one perforation unit external to the container is shaped to include an elongated thermal pathway for the controlled egress of material from the at least one storage region.

13. The container of claim 1, wherein the at least one perforation unit internal to the container is shaped to include an elongated thermal pathway for the controlled egress of material from the at least one storage region.

14. The container of claim 1, comprising:
at least one layer of nontoxic material on an interior surface of one or more of the at least one storage region.

15. The container of claim 1, comprising:
at least one layer including at least one metal on an interior surface of one or more of the at least one storage region.

16. The container of claim 1, wherein the one or more segments of ultra efficient insulation material define a plurality of substantially temperature-stabilized storage regions.

17. The container of claim 1, comprising:
at least one region within an interior of the container that is at a higher gaseous pressure than the atmospheric pressure exterior to the container.

* * * * *